(12) United States Patent
St-Pierre

(10) Patent No.: US 9,406,138 B1
(45) Date of Patent: Aug. 2, 2016

(54) SEMI-AUTOMATIC POLYLINE EXTRACTION FROM POINT CLOUD

(71) Applicant: Bentley Systems, Incorporated, Exton, PA (US)

(72) Inventor: Mathieu St-Pierre, Ste-Brigitte De Laval (CA)

(73) Assignee: Bentley Systems, Incorporated, Exton, PA (US)

( * ) Notice: Subject to any disclaimer, the term of this patent is extended or adjusted under 35 U.S.C. 154(b) by 296 days.

(21) Appl. No.: 14/029,576

(22) Filed: Sep. 17, 2013

(51) Int. Cl.
*G06T 7/00* (2006.01)

(52) U.S. Cl.
CPC .................................. *G06T 7/0046* (2013.01)

(58) Field of Classification Search
None
See application file for complete search history.

(56) References Cited

U.S. PATENT DOCUMENTS

| | | | |
|---|---|---|---|
| 5,093,869 A | 3/1992 | Alves et al. | |
| 5,978,504 A | 11/1999 | Leger | |
| 6,133,921 A | 10/2000 | Turkiyyah et al. | |
| 7,864,302 B2 | 1/2011 | Pook et al. | |
| 7,995,054 B2 | 8/2011 | Wheeler et al. | |
| 8,108,119 B2 | 1/2012 | Southall et al. | |
| 8,199,977 B2 | 6/2012 | Krishnaswamy et al. | |
| 8,798,372 B1 * | 8/2014 | Korchev | G06K 9/00637 382/195 |
| 2005/0100220 A1 * | 5/2005 | Keaton | G06K 9/0063 382/191 |
| 2007/0130239 A1 * | 6/2007 | Wheeler | G06K 9/00201 708/130 |
| 2009/0103773 A1 | 4/2009 | Wheeler et al. | |
| 2009/0190798 A1 | 7/2009 | Lee et al. | |
| 2010/0017060 A1 | 1/2010 | Zhang et al. | |
| 2010/0034426 A1 | 2/2010 | Takiguchi et al. | |
| 2010/0164951 A1 | 7/2010 | Stewart | |
| 2010/0284572 A1 * | 11/2010 | Lukas | G06K 9/00201 382/107 |
| 2010/0315412 A1 | 12/2010 | Sinha et al. | |
| 2011/0052079 A1 | 3/2011 | Tamura | |
| 2011/0118967 A1 | 5/2011 | Tsuda | |
| 2012/0069012 A1 | 3/2012 | Facchin et al. | |

FOREIGN PATENT DOCUMENTS

CN 101763512 A * 3/2012 ............... G01S 7/48

OTHER PUBLICATIONS

Harvey, W. A., and David M. McKeown Jr. "Automatic Compilation of 3D Road Features Using LIDAR and Multi-spectral Source Data." Proceedings of the ASPRS Annual Conference. 2008.*

(Continued)

*Primary Examiner* — Daniel Hajnik
(74) *Attorney, Agent, or Firm* — Cesari and McKenna, LLP; James A. Blanchette

(57) ABSTRACT

In one embodiment, a technique is provided for semi-automatically extracting a polyline from a linear feature in a point cloud. The user may provide initial parameters, including a point about the linear feature and a starting direction. A linear feature extraction process may automatically follow the linear feature beginning in the starting direction from about the selected point. The linear feature extraction process may attempt to follow a linear segment of the linear feature. If some points may be followed that constitute a linear segment, a line segment modeling the linear segment is created. The linear feature extraction process then determines whether the end of the linear feature has been reached. If the end has not been reached, the linear feature extraction process may repeat. If the end has been reached, the linear feature extraction process may return the line segments and create a polyline from them.

21 Claims, 23 Drawing Sheets

(56) References Cited

OTHER PUBLICATIONS

Sithole, George, and George Vosselman. "Experimental comparison of filter algorithms for bare-Earth extraction from airborne laser scanning point clouds." ISPRS journal of photogrammetry and remote sensing 59.1 (2004): 85-101.*
Hatger, Carsten, and Claus Brenner. "Extraction of road geometry parameters from laser scanning and existing databases." International Archives of Photogrammetry, Remote Sensing and Spatial Information Sciences 34.part 3 (2003): W13.*
Lin, Xiangguo, et al. "Semi-automatic extraction of ribbon roads from high resolution remotely sensed imagery by T-shaped template matching." Geoinformatics 2008 and Joint Conference on GIS and Built Environment: Classification of Remote Sensing Images. International Society for Optics and Photonics, 2008.*
Zhou, Jun, Walter F. Bischof, and Terry Caelli. "Road tracking in aerial images based on human-computer interaction and Bayesian filtering." ISPRS journal of photogrammetry and remote sensing 61.2 (2006): 108-124.*
Zhao, Jiaping, Suya You, and Jing Huang. "Rapid extraction and updating of road network from airborne LiDAR data." Applied Imagery Pattern Recognition Workshop (AIPR), 2011 IEEE. IEEE, 2011.*
Arastounia, Mostafa, "Automatic Classification of LIDAR Point Clouds in a Railway Environment," Faculty of Geo-Information Science and Earth Observation of the University of Twente, Enschede, The Netherlands, Mar. 2012, pp. 1-83.
"Delivering Value from LiDAR System Data," Certainty 3D-Software Products, <http://www.certainty3d.com/products/topodot/>, Retrieved on Aug. 16, 2013, pp. 1-2.
"Exelis," Exelis Visual Information Solutions, < http://www.exelisvis.com/docs/tutorialprocessdatasample.html>, Retrieved on Aug. 16, 2013, pp. 1-8.
"Getting Started in PointCloud CAD 2010," MicroSurvey Software, Inc., 2009, pp. 1-192.
Jwa, Y., et al., "Automatic 3D Poweline Reconstruction Using Airborne LiDAR Data," IAPRS, vol. 38, Part 3/W8, Paris, France, Sep. 1-2, 2009, pp. 1-6.
Kamphaus, Benjamin D., "LIDAR Data Analysis Software," GEO Informatics, Jan./Feb. 2012, pp. 18-20.
Melzer, Thomas, et al. "Extracting and Modeling of Power Lines from ALS Point Clouds," 2004, pp. 1-8.
"TerraScan," Terrasolid, <http://www.terrasolid.fi/system/files/TerraScan_eng_2.pdf>, Retrieved on Aug. 16, 2013, pp. 1-2.
"TerraScan User Guide," Arttu Soininen, Terrasolid, Oct. 3, 2011, pp. 1-311.
"VG4D SmartLiDAR™ Explorer," Virtual Geometrics, Inc., 2012, pp. 1.
"VRMesh v7.6: 3D Point Cloud and Mesh Processing Software," VirtualGrid, <http://www.vrmesh.com>, Retrieved on Aug. 16, 2013, pp. 1-4.
Wang, Wenping, et al., "Fitting B-Spline Curves to Point Clouds by Curvature-Based Squared Distance Minimization," ACM Transactions on Graphics, vol. 25, No. 2, Apr. 2006, pp. 214-238.

* cited by examiner

2100

SEMI-AUTOMATIC POLYLINE EXTRACTION FROM POINT CLOUD

TECHNICAL FIELD

The present disclosure relates to point clouds, and more specifically to techniques for semi-automatically extracting polylines from linear features of point clouds.

BACKGROUND INFORMATION

A point cloud is a set of points in three-dimensional (3-D) space that represents surfaces of one or more objects (e.g., in the physical environment). Each point of a point cloud is typically associated with coordinates (e.g., an x-axis coordinate, a y-axis coordinate, and a z-axis coordinate) of a coordinate system (e.g., a Cartesian coordinate system). Point clouds are often created by 3-D scanners that employ light detection and ranging (LIDAR) technology. However, other remote sensing technology, such as stereoscopic imagery, may be employed to create point clouds. Modern point clouds often contain millions or even billions of points. By use of large numbers of individual points, is point clouds may represent objects with a high level of precision. With such precision, a point cloud may be used to capture narrow elongated objects, such as transmission lines, railroad tracks, road markings and the like. Such narrow elongated objects are referred to herein generally as "linear features."

In addition to coordinates, each point of a point cloud may be associated with certain properties. In some cases, for instance when a point cloud is obtained using LIDAR technology, each point in the point cloud may also be associated with a reflectance intensity (e.g., such that each point has an x-axis coordinate, a y-axis coordinate, a z-axis coordinate, and a reflectance intensity). The reflectance intensity can be used to discriminate between objects. For example, road markings usually reflect light more than the bare asphalt of a road surface. By looking to the reflectance intensity of points, a system may be able to discriminate between the road markings and the bare road surface, despite the two being part of the same geometric surface.

When visually displayed, points of a point cloud may be colored (e.g., in gray-scale or with red-green-blue (RGB) values) based on one or more properties. For example, points may be colored based on their reflectance intensity, for example, to visually distinguish between road markings and the bare asphalt of a road surface. FIG. 1 is a view 100 of an example point cloud that has been colored based on reflectance intensity.

Similar to pixels of a two-dimensional (2-D) image, points of point clouds often cannot be effectively used in engineering applications in their native form. While a point cloud may provide a precise picture of objects in a scene, the points themselves are generally not suited for direct use in analyzing the scene. For example, points generally cannot be directly used in computing geometric properties (e.g., length, surface area, volume, etc.) of objects. To have a form that can be more easily analyzed, a line-based model may be reconstructed from a point cloud. A line-based model generally represents objects using one or more polylines, i.e. continuous lines composed of one or more line segments. For example, a polyline may represent a linear feature (e.g., a road marking, a railroad track, a transmission line, etc.). The polylines of the line-based model, rather than the underlying points, can be subject to the desired analysis.

Creating polylines to represent linear features in a point cloud may be challenging. Some systems employ a manual approach. However, creating polylines manually may present problems. One problem that stems from the non-solid nature of point clouds is that objects located behind a region of interest may become visible. When viewed from afar, a point cloud may appear solid. However, when viewed closer it becomes apparent that the point cloud is really composed of discrete points with spaces in between. If a user zooms in on a particular region of interest in a point cloud, points describing objects located behind the region of interest may become visible through the spaces between points in the foreground.

FIG. 2 is a view 200 of an example point cloud showing an overpass 210 having road markings 220 as viewed from afar. In FIG. 2, the road markings 220 on the overpass 210, including the road markings near reference dot 230 on the overpass's surface, are clearly visible.

FIG. 3 is an example of an enlarged view 300 of the point cloud of FIG. 2. As can be seen, after zooming in on a portion of the overpass, the road markings near reference dot 230 begin to vanish. Worse still, some road markings 310 from another roadway below the overpass, located near reference dot 320, may start to become visible, confusing the view.

Another problem that stems from the non-solid nature of point clouds is that it may be difficult to select the correct points to "snap" to. During manual creation of a polyline, a user typically "snaps" to points, to establish a position of the line in 3-D space. However, given that the point cloud is not solid, it is often difficult to select the correct points. A point may appear to be a part of the desired object when the point cloud is viewed from one perspective, but it may become obvious that the point is not part of the desired object (e.g., is part of an object above or below the desired object), if the point is cloud is viewed from another perspective.

FIG. 4 is an example near top down view 400 of a point cloud showing a polyline 410 that has been drawn in an attempt to model a road marking on an overpass. From a near top down perspective, it appears that the polyline 410 is a good representation of the road marking. As in the other examples, reference dot 230 is on the overpass's surface, while reference dot 320 is located on the roadway below.

FIG. 5 is an example of an isometric view 500 of the point cloud of FIG. 4. From the isometric perspective, it becomes clear that one end of the polyline 410 is not even near the road marking on the overpass's surface (near reference dot 230). Instead, one endpoint of the polyline 410 is actually near a roadway passing below the overpass (near reference dot 320)

In addition to these problems stemming from the non-solid nature of point clouds, further problems are often encountered when trying to manually create polylines to represent linear features. One such problem is that a user may be burdened having to select a large number of points to accurately model a linear features. As mentioned above, a point cloud may include millions or billions of points, and therefore can describe linear features in great detail. To accurately represent some linear features (e.g., curving linear features, such as transmission lines), a polyline may have to be "snapped" to a large number of individual points to capture the contours of the curves. This may require hours of tedious manual operations.

Yet another problem may stem from occlusion of some parts of linear features by other objects. For example, referring back to the example in FIG. 3, it can be seen that the road marking near reference dot 310 is partly hidden by the points that represent the overpass. To fully see the occluded linear features, a user may have to clip the point cloud. For example, in reference to FIG. 3, a user may have to clip the portion of the point cloud that represents the overpass. However, this requires extra operations and therefore decreases productivity.

Accordingly, there is a need for a technique that can extract polylines from a point cloud semi-automatically, to allow for fast and precise modeling of linear features of a is point cloud.

SUMMARY

In one embodiment, the shortcomings of the prior art are addressed by a technique for semi-automatically extracting a polyline from a linear feature in a point cloud. The user may provide initial parameters, including a point in the point cloud about the linear feature and a starting direction along which points are to be followed. Once these parameters are entered, a linear feature extraction process may automatically follow the linear feature beginning in the starting direction from about the selected point until it can no longer be followed. Such following may involve repeating a sequence of operations. The linear feature extraction process may first attempt to follow a linear segment of the linear feature. If some points may be followed that constitute a linear segment, a line segment modeling the linear segment is created. The linear feature extraction process then determines whether the end of the linear feature has been reached. If the end of the linear feature has not been reached, the linear feature extraction process may repeat, and try to follow another linear segment of the linear feature. If the end has been reached, the linear feature extraction process may return the line segments and create a polyline from them, modeling the linear feature of the point cloud.

A number of special features may be implemented by the semi-automatic linear feature extraction process. Among other features, an intersection detection sub-process may determine when an intersection point of a linear feature has been reached and re-quest the user provide an appropriate search direction to use after that intersection point. Further, a gap jumping sub-process may determine whether there the end of the linear feature is a true end, or is simply an occlusion of the linear feature or a non-continuous portion of a linear feature. If it is determined that there is a jumpable gap, the linear feature extraction process may repeat again and try to follow another linear segment of the linear feature after the gap.

It should be understood that the linear feature extraction process may include a variety of other features, including other features discussed below, and variations thereof. This Summary is intended simply as a brief introduction to the reader, and does not imply is that the features mentioned herein are necessary, or essential, to the invention.

BRIEF DESCRIPTION OF THE DRAWINGS

The detailed description below refers to the accompanying drawings of example embodiments, of which.

DETAILED DESCRIPTION

Figure 1:
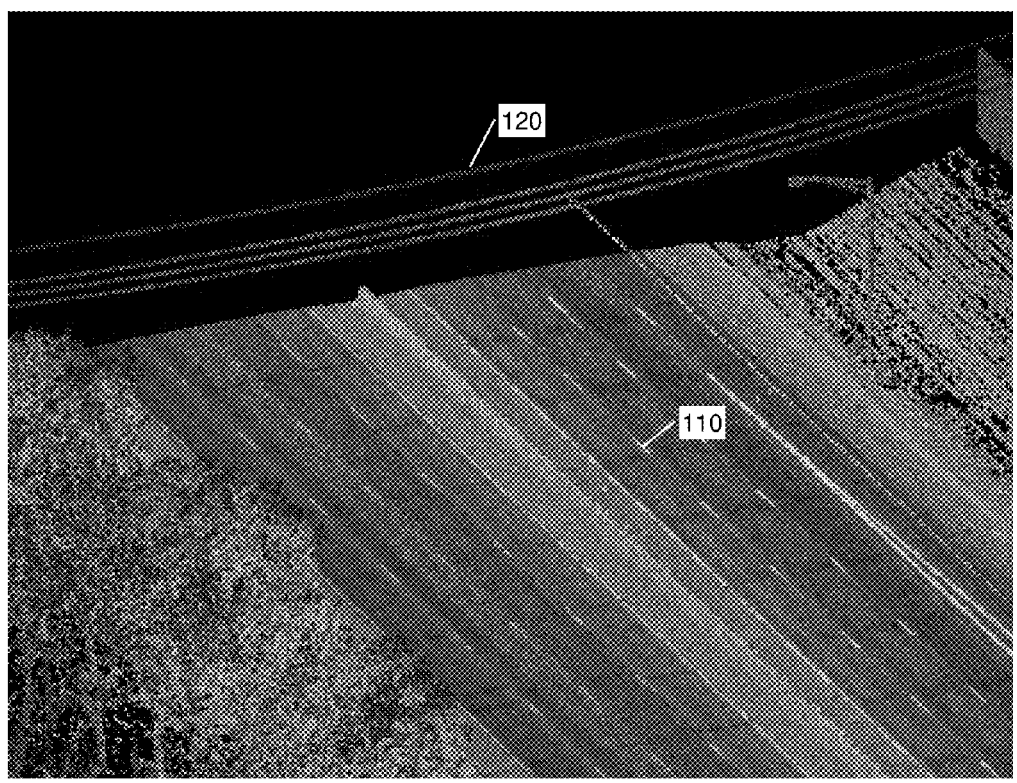
FIG. 1 is a view of an example point cloud that has been colored based on reflectance intensity.
Figure 2:
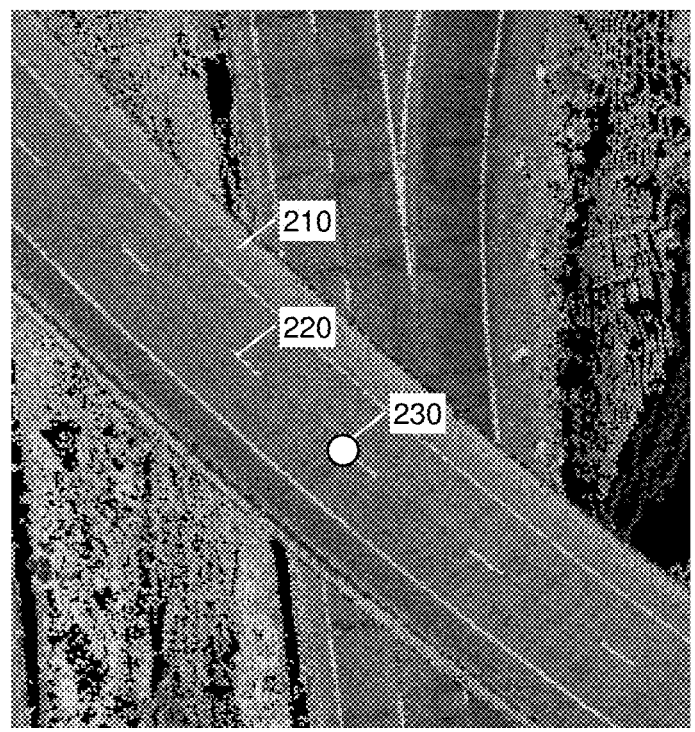
FIG. 2 is a view of an example point cloud showing an overpass having road markings as viewed from afar.
Figure 3:
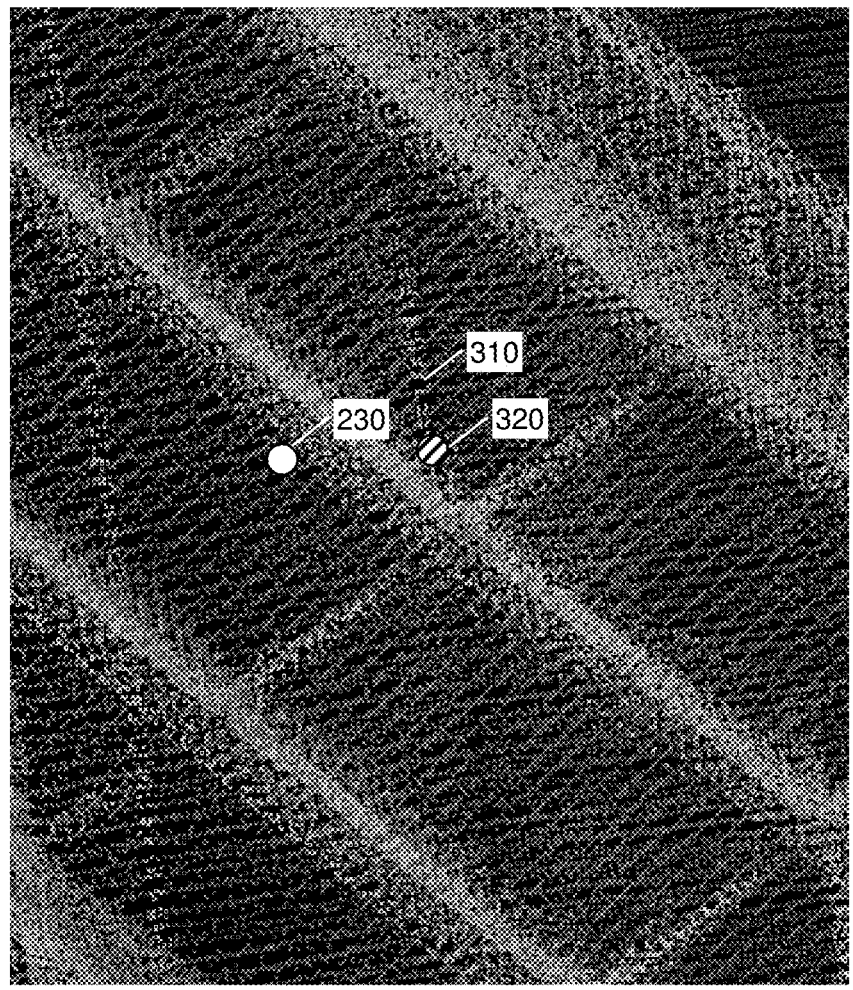
FIG. 3 is an example of an enlarged view of the point cloud of FIG. 2.
Figure 4:
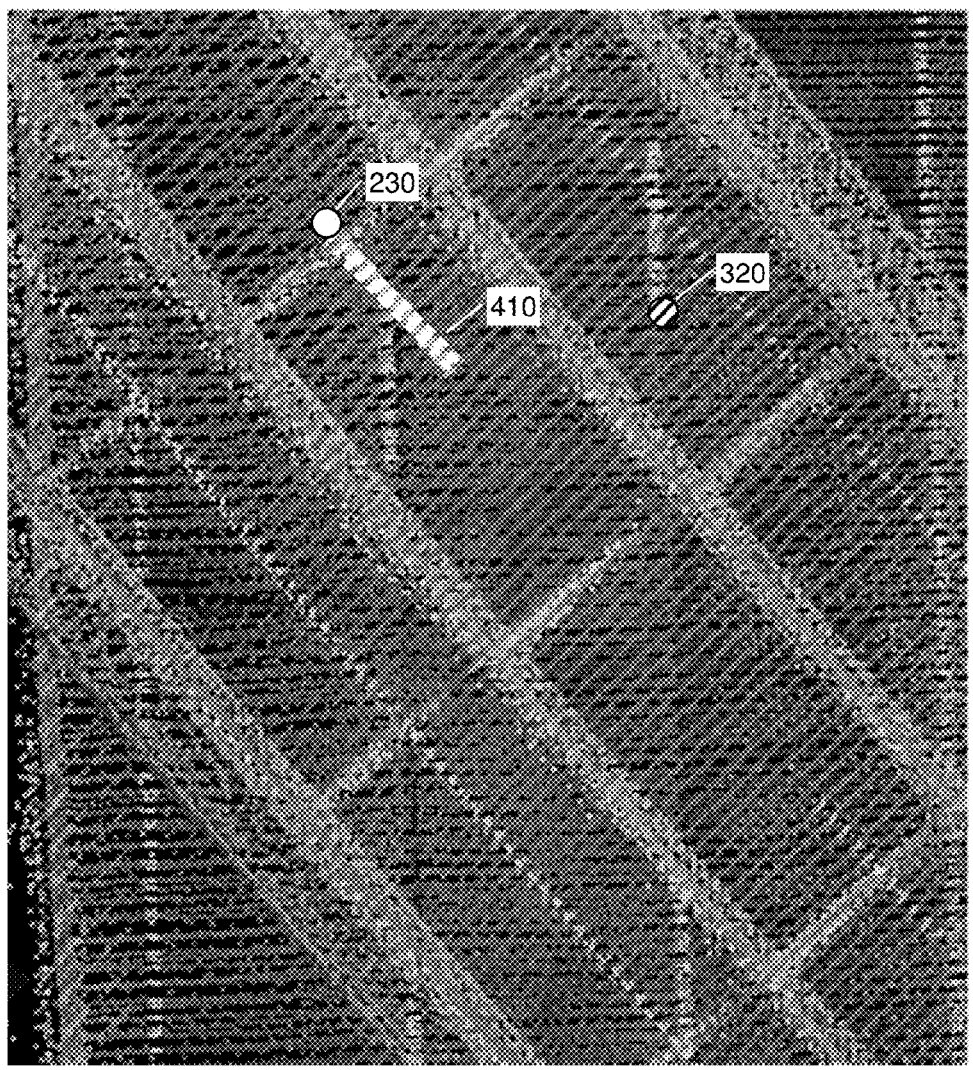
FIG. 4 is an example near top down view of a point cloud showing a polyline that has been drawn in an attempt to model a road marking on an overpass.
Figure 5:
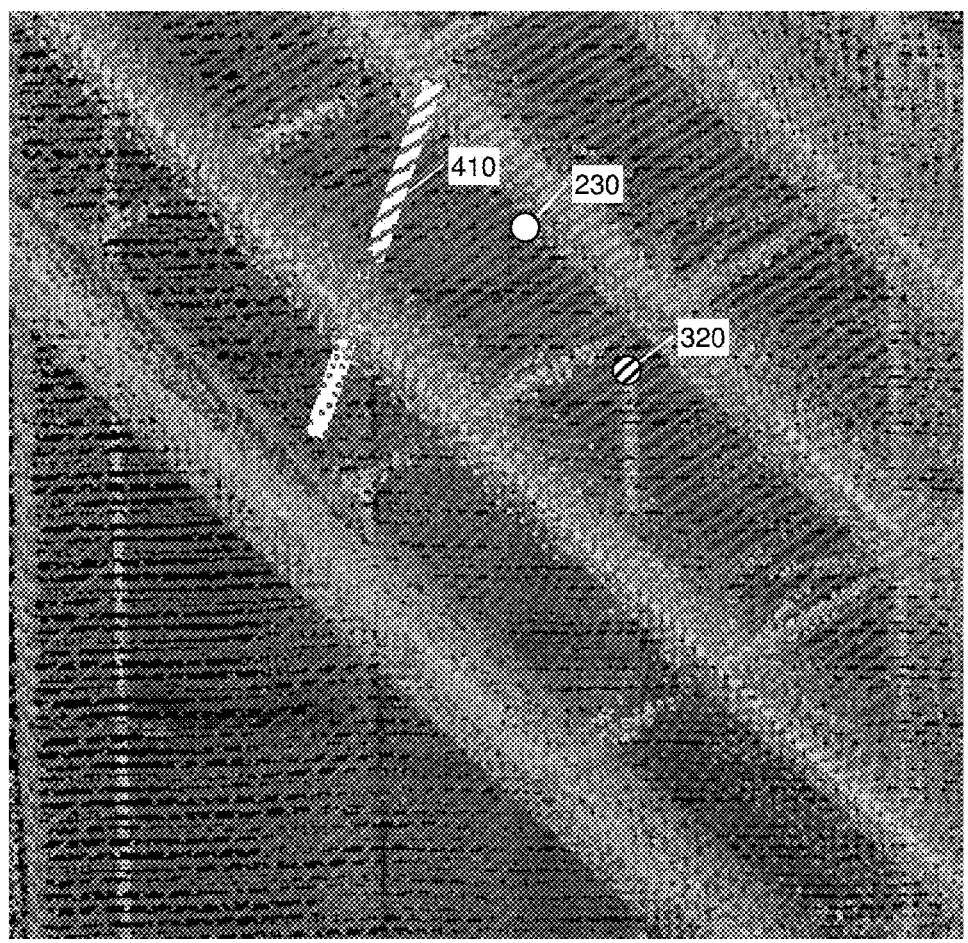
FIG. 5 is an example of an isometric view of the point cloud of FIG. 4.
Figure 6:
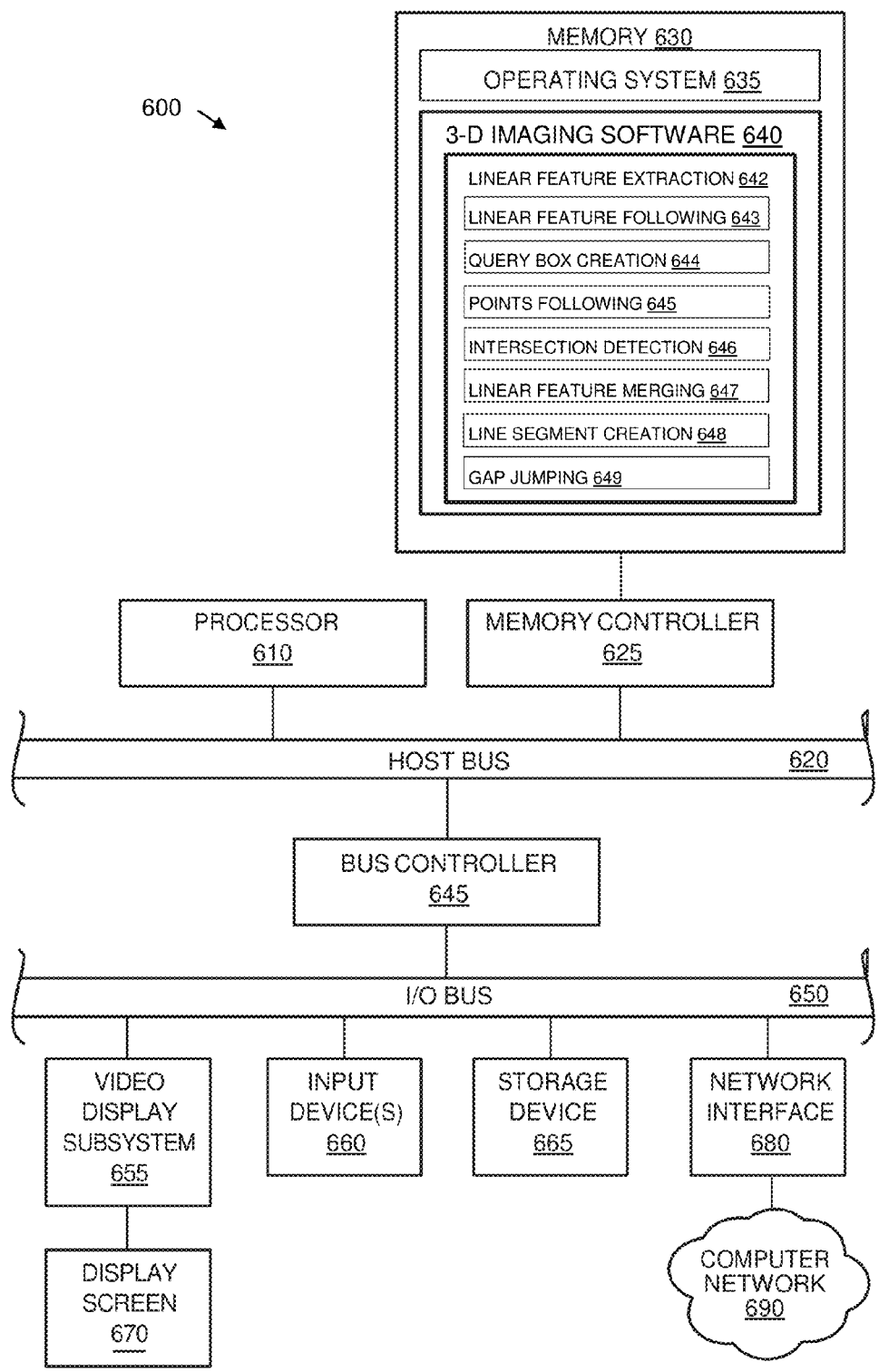
FIG. 6 is a block diagram of an example electronic device that may be used in semi-automatically extracting a polyline from a linear feature of a point cloud.

FIG. 6 is a block diagram of an example electronic device 600, (e.g., a computer), that may be used in semi-automatically extracting a polyline from a linear feature of a point cloud. The electronic device 600 includes at least one processor 610 coupled to a host bus 620. The processor 610 may be any of a variety of commercially available pro-cessors, such as an Intel x86 processor, or another type of processor. A volatile memory 630, such as a Random Access Memory (RAM), is coupled to the host bus 620 via a memory controller 625. The memory 630 is configured to store at least a portion of computer-executable instructions and data for an operating system 635 while the electronic device 600 is operating. In addition, the memory 630 may store at least portions of 3-D Imaging software 640. The 3-D Imaging software 640 may be Bentley Descartes V8i SELECTSeries 4 software, available from Bentley Systems Inc. In one embodiment, the 3-D Imaging software 640 includes a linear feature extraction process 642. The linear feature extraction process 642 includes a number of sub-processes that perform constituent functions, including an automatic linear feature following sub-process 643, a query box creation sub-process 644, a points following sub-process 645, an intersection detection sub-process 646, a linear feature merging sub-process 647, a line segment creation sub-process 648, and a gap jumping sub-process 649.

The host bus 620 of the electronic device 600 is coupled to an input/output (I/O) bus 650 through a bus controller 645. A video display subsystem 655 may include a display screen 670, and hardware to drive the display screen. The video display subsystem 655 is coupled to the I/O bus 650. The display screen 670, among other functions, may show a user interface of the 3-D Imaging software 640, and more specifically the linear feature extraction process 642. One or more input devices 660, such as a keyboard, a mouse, etc., are provided and used for interaction with the electronic device 600, and the 3-D Imaging software 640 and linear feature extraction process 642 thereof. A persistent storage device 665, such as a hard disk drive, a solid-state drive, or other type or persistent data store, is coupled to the I/O bus 650, and may persistently store computer-executable instructions and data, that are available to be loaded to the volatile memory 630 when needed. For example, computer-executable instructions and data for the operating system 635, the 3-D Imaging Software 640, and the linear feature extraction process 642 thereof. The I/O bus 650 may further be coupled to a network interface 680 that interfaces with a computer network 690. The computer network 690 may allow communication between the electronic device 600 and other devices, using any of a number of well known networking protocols, including wireless networking protocols, to permit a variety of distributed, collaborative or remote computing configurations.

Figure 7:
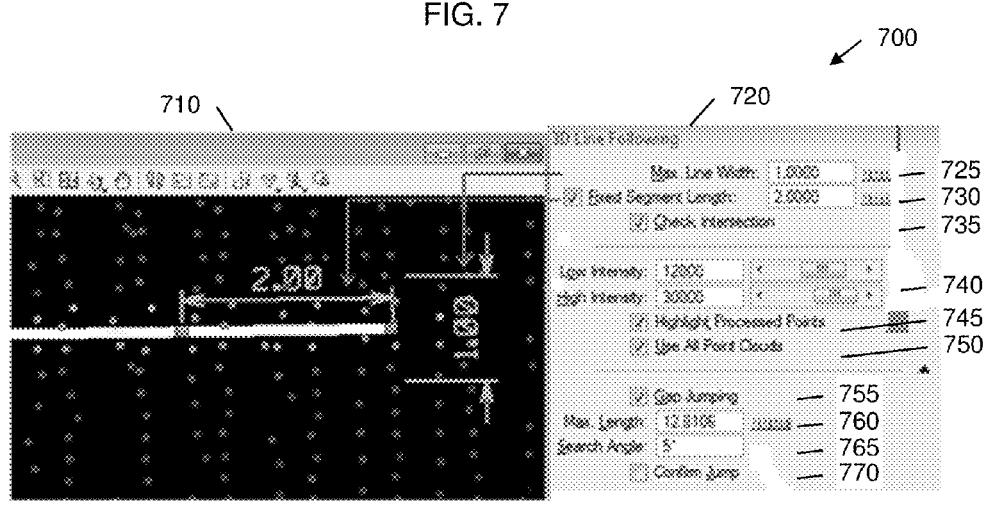
FIG. 7 is an example user interface for use with a linear feature extraction process.

FIG. 7 is an example user interface 700 for use with the linear feature extraction process 642. Various parameters are introduced in relation to the user interface 700. Further explanation of the use of these parameters is reserved for discussion further below. In panel 710, a user may select a point in the point cloud about a linear feature, and graphically indicate a starting direction along which points are to be followed. In panel 720, the user may enter various other parameters in various fields. These fields may include a max line width field 725 that receives a maximum width of the polyline to be extracted, a segment length field 730 that, when selected, may force every segment of a polyline created for a given linear feature to have a same length, and a check intersection field 735 that, when selected, may cause the intersection detection sub-process 646 to be activated. Further, the fields may include a low/high intensities field 740, which receives a reflectance intensity range that determines which points of the point cloud need to be considered, a highlight processed points field 745, that when selected, causes points to be colored whose reflectance intensity falls inside the selected reflectance intensity range, and a use all point clouds field 750 that, when selected, causes use of all point clouds that are available, when there are multiple potential point clouds available. Still further the fields may include a gap jumping field 755, that controls whether the gap jumping sub-process 649 is to be executed, a max length field 760 that receives a maximum allowed distance of a jumpable gap, a search angle field 765 that receives a search angle to used during a search for a location to jump to, and a confirm jump field 770 that, when selected, causes control to be returned to the user after the occurrence of a successful gap jump.

Figure 8:
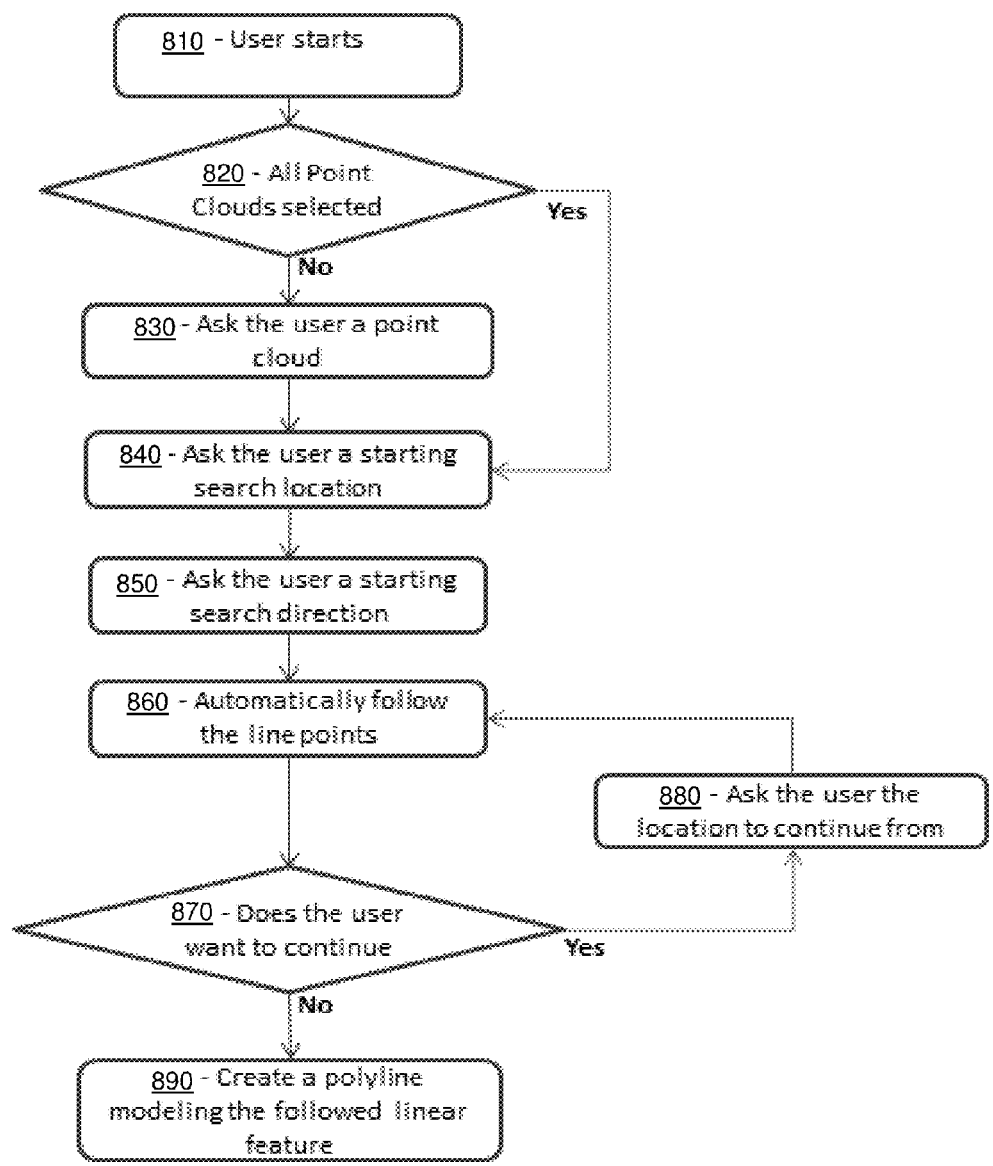
FIG. 8 is an example sequence of steps for user interaction with the linear feature extraction process.

FIG. 8 is an example sequence of steps 800 for user interaction with the linear feature extraction process 642. At step 810, the user starts the linear feature extraction process 642. At step 820, a check is performed whether the use all point clouds field 750 of the user interface 700 has been selected, indicating all available point clouds should be utilized. If all available point clouds are not to be utilized, at step 830, the user is prompted to specify the point cloud that includes the linear feature of interest, and then execution proceeds to step 840. If all available point clouds are to be utilized, execution proceeds directly to step 840. At step 840, the user is prompted to select a point about the linear feature. Once the point about the linear feature has been selected by the user, at is step 850, the user is prompted to enter a starting direction along which points are to be followed. Usually this direction is a direction along the linear feature near the point selected in step 840. At step 860, the linear feature extraction process 642 automatically follows points until the linear feature can no longer be followed, as discussed in more detail below. At step 870, the user is prompted whether the linear feature extraction process 642 should continue following points from a current location, i.e. the last location before the linear feature extraction process 642 could no longer follow points of the linear feature. If the linear feature extraction process 642 should continue following points, the user is prompted, at step 880, to enter another point in the point cloud about the linear feature. The displacement between this new point and the current location is then used as a new search direction. Execution then proceeds back to step 860, where the linear feature extraction process 642 automatically follows the linear feature using the new point and the new search direction, to follow more points representing the linear feature. If not, at step 890, the linear feature extraction process 642 ends, and a polyline is created that represents the linear feature.

Figure 9:
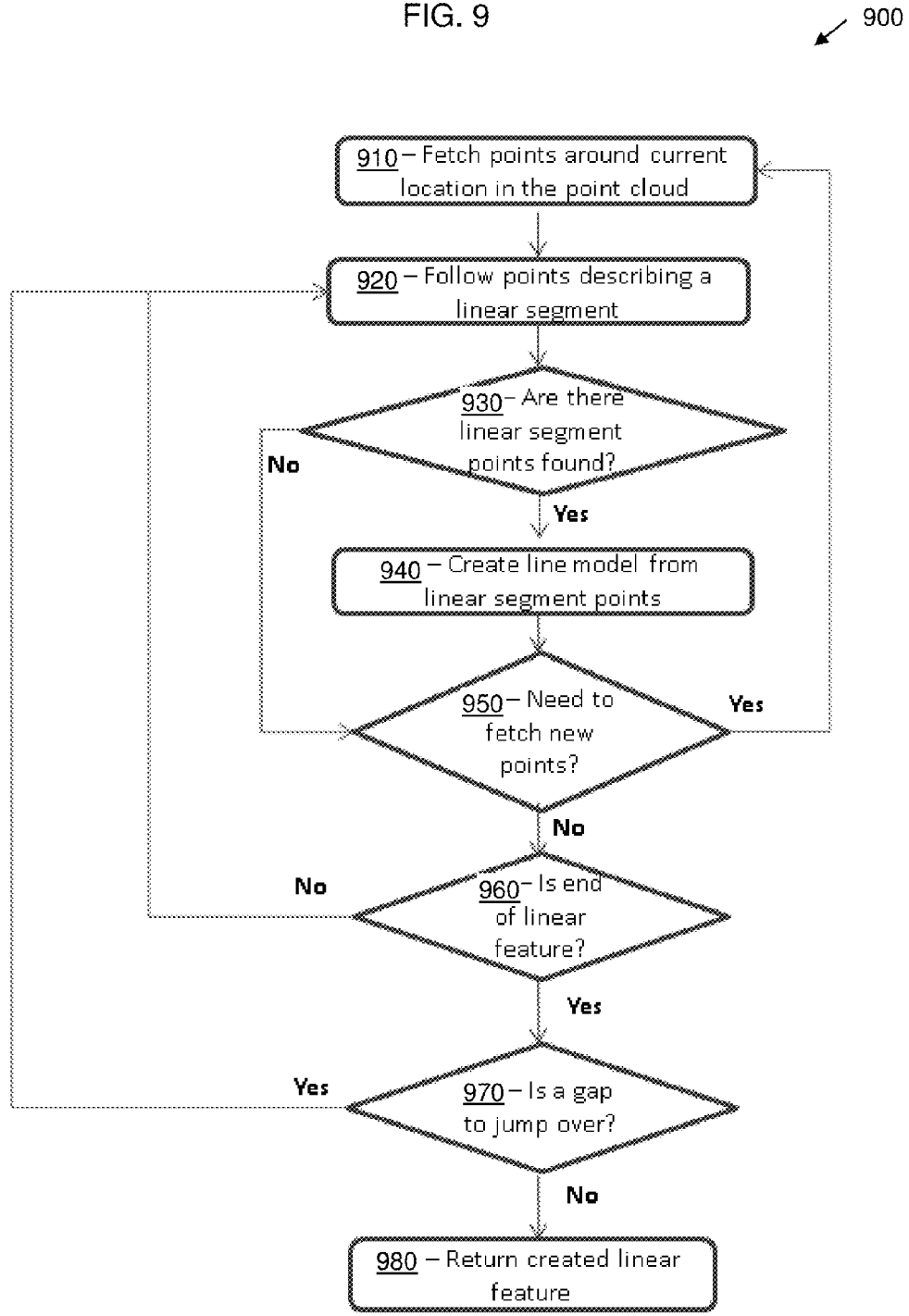
FIG. 9 is an example sequence of steps executed by the automatic linear feature following sub-process to automatically follow a linear feature.

FIG. 9 is an example sequence of steps 900 executed by the automatic linear feature following sub-process 643 to automatically follow a linear feature. The sequence of steps 900 may represent steps performed as part of step 860 in FIG. 8. At step 910, the automatic linear feature following sub-process 643 extracts points around a current search location. Initially, the current search location is defined by a user-selected point and direction. The number of points fetched may be kept small in light of memory size limitations of the electronic device 600. At step 920, from the fetched points, the line following sub-process 643 tries to follow one linear segment of the linear feature in the point cloud. At step 930, it is determined whether points describing the linear segment can be found. If some points describing a linear segment are found, at step 940, a line segment modeling the linear segment is created, for example, using a RANdom SAmple Consensus (RANSAC) algorithm. After this, or if no points describing a linear segment can be found, at step 950 the automatic linear feature following sub-process 643 checks if other points need to be fetched from the point cloud. If other points need to be fetched, is execution loops back to step 910, where the automatic linear feature following sub-process 643 extracts points using the last location where points where followed as a current search location. If no other points need to be fetched, execution proceeds to step 960, where the automatic linear feature following sub-process 643 checks if the end of the linear feature has been reached. If the end has not been reached, execution loops back to step 920, where the automatic linear feature following sub-process 643 tries to follow another segment of the linear feature. If the end has been reached, at step 970, a gap jumping sub-process 649 determines whether there is a jumpable gap. If there is a jumpable gap, the gap jumping sub-process 649 jumps to a first available point on the other side of the gap, and execution loops back to step 920, where a linear segment is flowed from the first available point. If there is no jumpable gap, execution proceeds to step 980 where the followed linear feature is returned. Based on user-input in the user interface 700 of FIG. 7, the gap jumping may sometimes be disabled. In such case, step 970 may be skipped over.

Figure 10A:
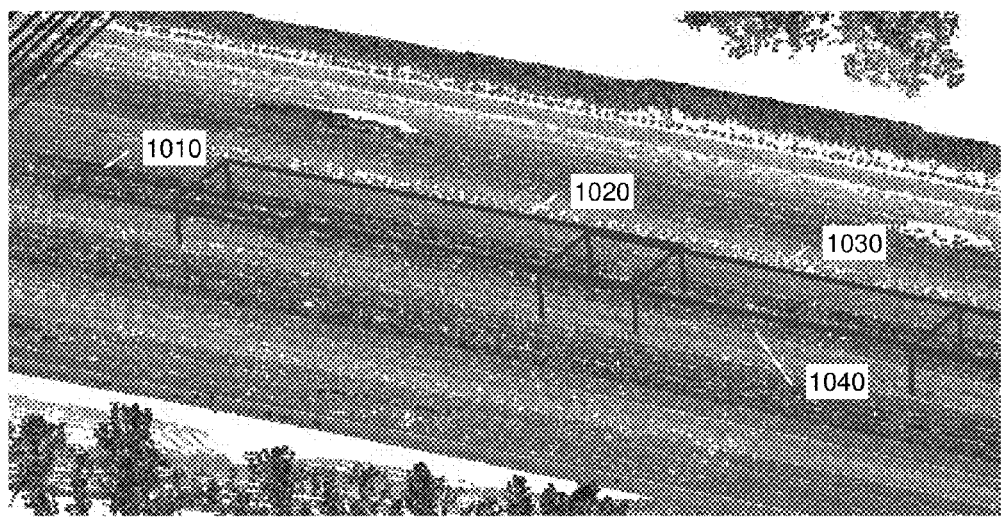
FIG. 10A is an example of query boxes imposed upon a point cloud about a linear feature.
Figure 10B:
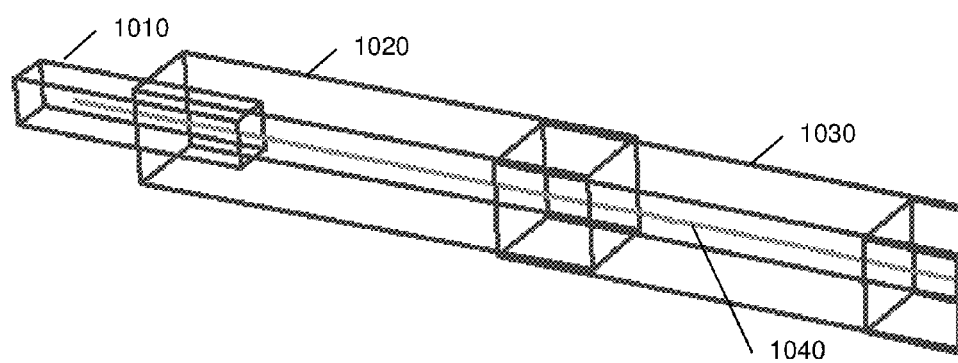
FIG. 10B shows the query boxes of FIG. 10A about the linear feature with the point cloud removed.

Given the large size of some point clouds and memory size limitations of the electronic device 600, it may be impractical or impossible to load all the points representing a linear feature into memory at one time. As such, a certain amount of points defined by a query box may be loaded and handled at a given time. FIG. 10A is an example of query boxes 1010, 1020, 1030 imposed upon a point cloud 1000 about a linear feature 1040. FIG. 10B shows the query boxes 1010, 1020, 1030 about the linear feature 1040 with the point cloud removed. The query boxes 1010, 1020, 1030 may have differing sizes (e.g., lengths, widths and heights). In one embodiment, the size of the query box is adapted automatically based on a point density around the current search location.

Figure 11:
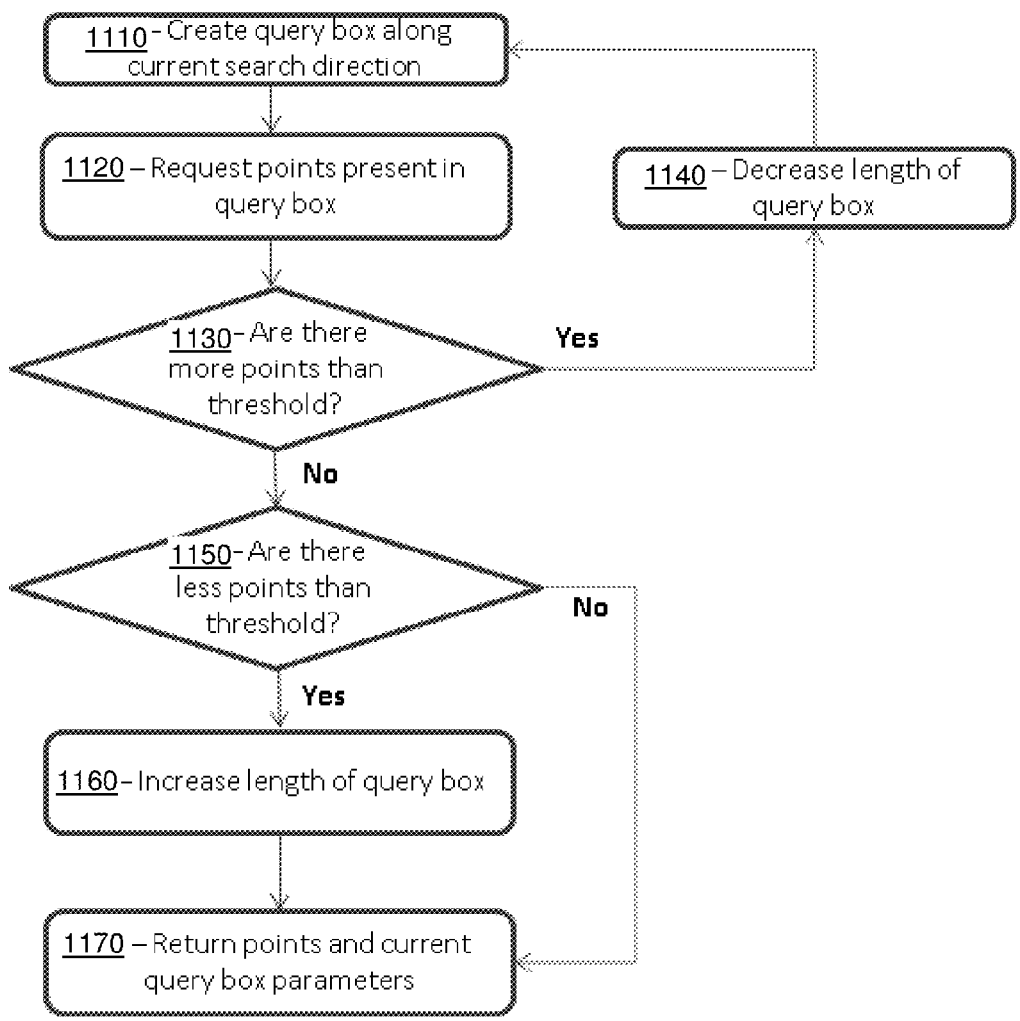
FIG. 11 is an example sequence of steps executed by the query box creation sub-process to extract points around a search location.

FIG. 11 is an example sequence of steps 1100 executed by the query box creation sub-process 644 to extract points around a search location. The sequence of steps 1100 may represent steps performed as part of the step 910 in FIG. 9. At step 1110, a query box is created that is aligned with the current search direction. The length of the query box is initially set, for example, to a value equal to the user-selected maximum line width parameter multiplied by 100, or some other value. The width and height of the query box are initial set to values, for example, to values defined by a ratio, or defined in some other manner. For example, the values for the width and height may be set to have a ratio of is width-to-length and a ratio of height-to-length equal to 0.2. By aligning the query box with the current search direction, the number of unnecessary points of the point cloud that are queried may be minimized, thus maximizing the speed of the linear feature extraction process 642. At step 1120, the query box creation sub-process 644 extracts points of the point cloud that fall within the query box. At step 1130, the number of points extracted is compared to a first threshold. In some cases, the length of the query box may initially be set to a value that returns an excessive number of points, which would result in the number of points extracted exceeding the first threshold. If the number of points exceeds the a first threshold (e.g., 200,000 points or some other value indicating an excessive number of points), execution proceeds to step 1140, where the query box creation sub-process 644 automatically decreases the length of the query box by a factor (e.g., by a factor of 2), and execution loops back to step 1110. If the number of points does not exceed the first threshold, execution proceeds to step 1150, where the number of points is compared to a second threshold (e.g., 30% of the first threshold or some other value indicating too few points). If the number of points falls below the second threshold, execution proceeds to step 1160, where the query box creation sub-process 644 increases the length of the query box. No further checking is performed on the increased query box, for example, to avoid a possible infinite loop of increasing and decreasing the query box size. Execution proceeds to step 1170.

Returning to step 1150, if the number of points does not fall below the second threshold, execution proceeds directly to step 1170. At step 1170, the points of the query box are extracted and the query box parameters are returned for initial use during creation of a next query box. By initially trying to use the same query box parameters, one may often avoid the need to resize the next query box when the point density is similar along a followed linear feature.

Figure 12:
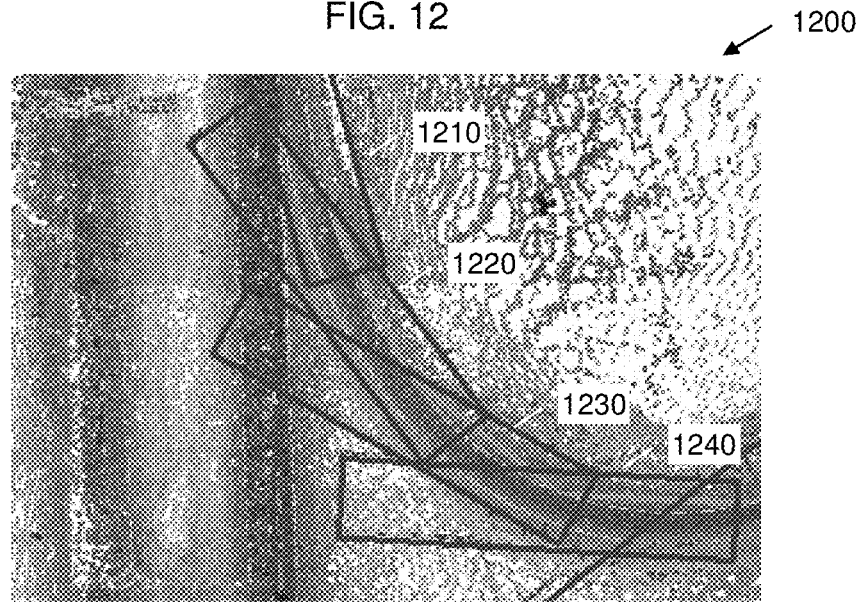
FIG. 12 is an example of query boxes aligned with a curving linear feature.

FIG. 12 is an example of query boxes 1210, 1220, 1230, 1240 aligned with a curving linear feature. The query boxes are each aligned with the current search direction to minimize the number of unnecessary points examined. Further, the query boxes have similar parameters, as the point density along the linear feature is similar.

Figure 13:
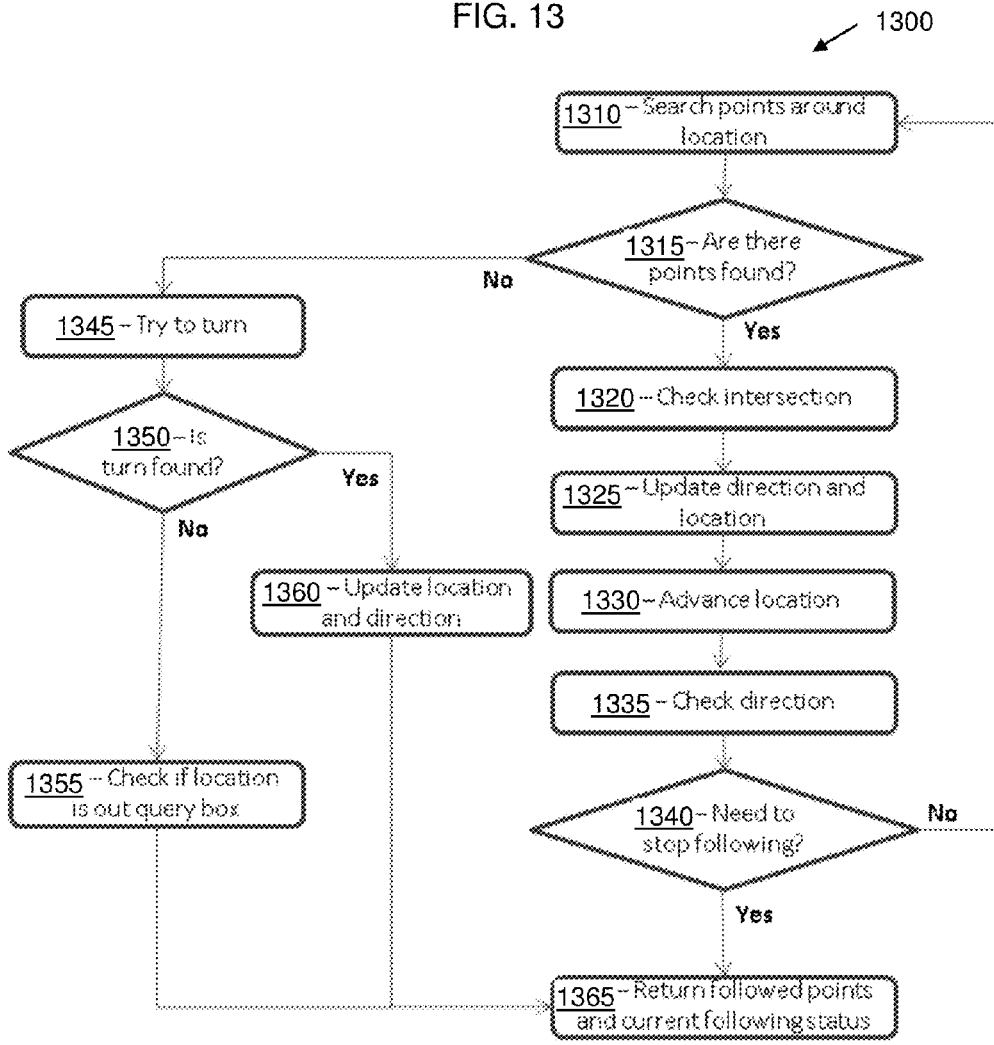
FIG. 13 is an example sequence of steps executed by the points following sub-process to follow points of a linear feature in a point cloud.

FIG. 13 is an example sequence of steps 1300 executed by the points following sub-process 645 to follow points of a linear feature in a point cloud. The sequence of is steps 1300 may represent steps performed as part of the step 920 in FIG. 9. At step 1310, the points following sub-process 645 searches within the fetched points for any points located in a search sphere positioned around the current search location. In one embodiment, the radius of the search sphere may be set to the user-selected maximum width from FIG. 7. At step 1315, it is determined where any points are found. If points are found, execution proceeds to step 1320, where the intersection detection sub-process 646 is triggered to check if an intersection point of the linear feature has been reached. If an intersection is reached, a points following status may be set to intersection found status, indicating an intersection has been reached. Based on user-input in the user interface of FIG. 7, the intersection detection sub-process 646 may be disabled, for example, to allow for faster execution when such detection is not needed. In such case, step 1320 may simply be skipped over. At step 1325, the direction and location of search is updated. In some embodiments, update of the direction and location of search may occur intermittently, such that, if execution loops through steps 1310 to 1340 repeatedly, step 1325 is executed in only certain ones of those iterations. For example, step 1325 may be executed only once for every predetermined number of iterations (e.g. for every 2 iterations) through steps 1310 to 1340, and skipped the other times.

At step 1325, the direction and location of search may be updated by computing the centroid of the points found at step 1310, computing a new direction from the last centroid computed, and then comparing an angle between the new search direction and the current search direction to a predetermined angle threshold. If the angle is less than the angle threshold (e.g., 45°), and if a distance between the centroid and the last centroid is greater than zero, the current search direction is set to the new search direction and the current search location is set to the centroid. The angle threshold may serve to decrease jittering effects when updating the direction and location.

At step 1330, the current search location is then advanced in the current search direction. The displacement distance which the search location is advanced may be set to a value, for example, to the radius of the search sphere. At step 1335, the current direction is then checked to determine if it has changed because the current linear segment is curving. The direction is deemed to have changed if the distance between the current location and a reprojection of the current location on the original direction vector is greater than a threshold. In one embodiment, the threshold is set to be the search sphere's radius multiplied by a factor (e.g., 0.5).

At step 1340, the points following sub-process 645 checks if points following for the current segment of the linear feature should be stopped. If a direction change has been detected 1335, or if an intersection has been detected at step 1320, points following generally should be stopped. If points following should be stopped, execution proceeds to step 1365 where the points following sub-process 645 returns the points found describing the current segment of the linear feature, and returns the current points following status. If points following should not be stopped, execution loops back to step 1310. Further the points following status may be set to can continue status to indicate the points following sub-process 645 can continue to follow the current linear feature.

Figure 14:
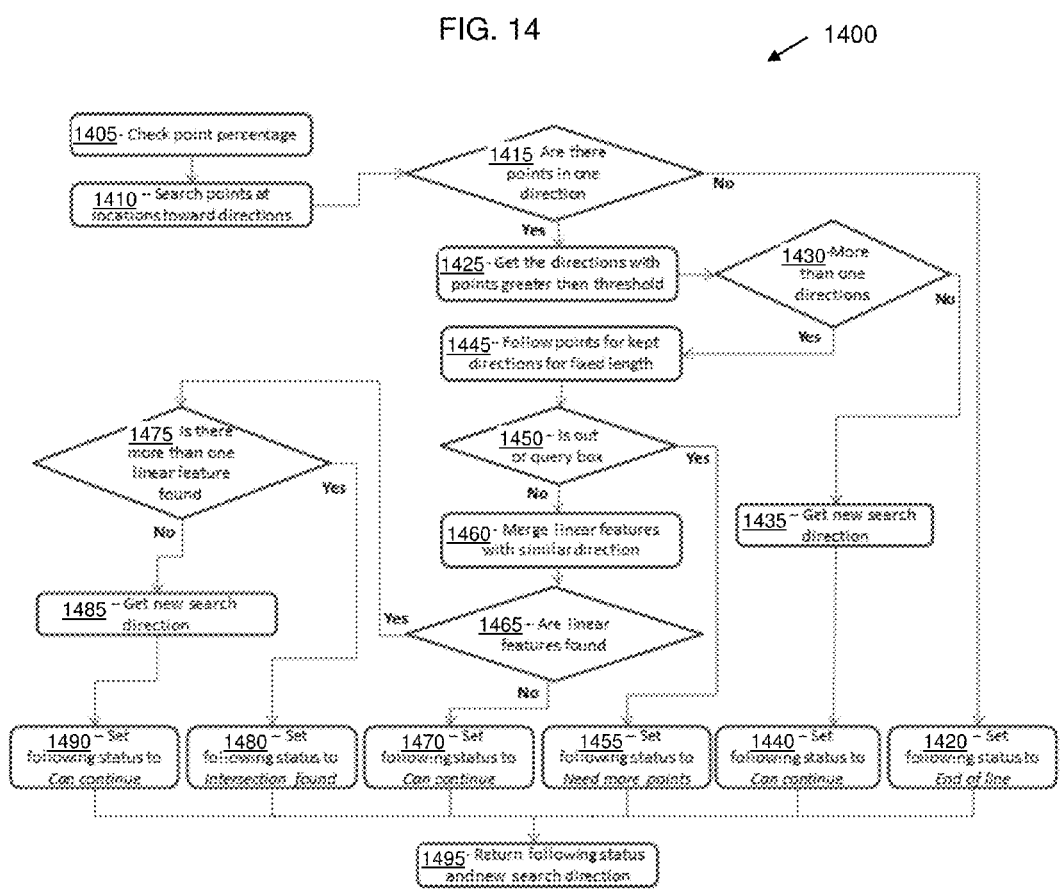
FIG. 14 is an example sequence of steps executed by the intersection detection sub-process to check if an intersection point of the linear feature has been reached.

Returning back to step 1315, if no point is found inside the search sphere, execution proceeds to step 1345, and the points following sub-process 645 tries to turn to find points. The turning may involve searching a segment connected to the end of the current segment, which has an angle with the current segment greater than would be considered in the direction update of step 1325. The process used to turn in step 1345 may be similar to the process used for detecting an intersection. At step 1350, it is determined whether there is a turn. If a turn is found, execution proceeds to step 1360, and the points following sub-process 645 updates the current location and the current direction, and triggers a direction modification. As part of step 1360, the points following status may be set to end of line status if the direction modification between the new and old direction is greater than a threshold. The threshold may be set by default to a value (e.g. 90°) and changed by the user, for example, by setting a configuration variable. Otherwise, if a turn is not found, execution proceeds to step 1355, where the points following sub-process 645 checks if the current location is outside the current query box. If the current location is located outside the current query box, more points need to be fetch. The points following status may be set to need more points status, to indicate that more points need to be fetched around the current location in the point cloud (step 910 of FIG. 9). Otherwise, the points following status may be set to end of line status FIG. 14 is an example sequence of steps 1400 executed by the intersection detection sub-process 646 to check if an intersection point of the linear feature has been reached. The sequence of steps 1400 may represent steps performed as part of the step 1320 in FIG. 13. At step 1405, the intersection detection sub-process 646 checks if a percentage of the number of points in the search sphere divided by a number of points in a larger search sphere is greater than a given threshold. The larger search sphere may be set to a value, for example, to twice the size of the search sphere. The given threshold alter-natively may be set to any of a variety of values. In one embodiment the given threshold is set to 0.7. Inclusion of step 1405 may help to minimize the number of times a full intersection check is needed, to speed the intersection detection sub-process 646. In some embodiments, step 1405 may be omitted. Further, step 1405 may be omitted if the intersection detection sub-process 646 is being applied to turn detection (i.e. step 1345 of FIG. 13).

Figure 15:
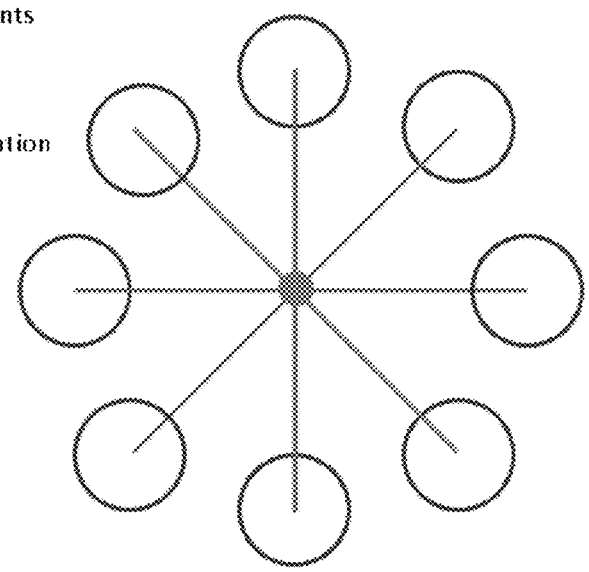
FIG. 15 is a diagram showing example search spheres disposed at search directions and separated from a current search location by search displacements.

At step 1410, the intersection detection sub-process 646 searches points around the current location in search directions at search displacements. FIG. 15 is a diagram 1500 showing an example configuration of search spheres disposed at search directions and separated from the current search location by search displacements. The angle between all neighboring search directions may the same. Similarly, the search displacements may all be the same for all search spheres. In one configuration, the number of search directions may be set to 16, and the search displacements set to be equal to the search sphere radius.

Returning to FIG. 14, after searching points around the current location in search directions at search displacements, at step 1415, a determination is made whether there are points in any search sphere along a search direction. If there are no points, execution proceeds to step 1420, where the points following status is set to end of line status. If there are points, execution proceeds to step 1425, where the intersection detection sub-process 646 determines any search directions whose respective search spheres yields a number of points greater than a minimum number of points. The minimum number of points may be set to a percentage of the maximum number of points found in any search sphere, or to some other value. In one embodiment, the percentage may be set to 10%. At step 1430, the intersection detection sub-process 646 determines whether more than one direction has been found. If there is only one direction with the minimum number of points, execution proceeds to step 1435, where the intersection detection sub-process 646 computes a new search direction. The new search direction is computed using the direction whose angle with the current search direction is the smallest, and for which some points have been found. A new search direction from the centroid of the points found for this search direction and the current search location is computed. If both the centroid and the current search location are the same, the new search direction is set directly to the direction whose angle with the current search direction is the smallest, and for which some points have been found during step 1410. At step 1440, the points following status is set to can continue status.

If there is more than one direction with the minimum number of points, execution proceeds to step 1445 where an attempt is made to follow the points along each such direction for a fixed number of searches. At step 1450, the intersection detection sub-process 646 determines whether, by following the points, a location outside the query box has been reached. If a location outside the query box has been reached, execution proceeds to step 1455, where the points following status is set to need more points status. If a location outside the query box has not been reached, execution proceeds to step 1460, where the linear feature merging sub-process 647 (described in more detail below) tries to merge linear features found for the kept directions. Then, at step 1465, the intersection detection sub-process 646 determines if there is at least one unmerged linear features found for the kept directions. If there is not at least one unmerged linear features found for the kept directions, execution proceeds to step 1470, where the points following status is set can continue status. If there is at least one unmerged linear features found for the kept directions, execution proceeds to step 1475, where a check is performed whether more than one linear feature is found. If more than one linear feature is found, execution proceeds to step 1480 where the points following status is set to intersection found status. If only one linear feature is found, execution proceeds to step 1485, where the intersection detection sub-process 646 computes a new search direction, using the search direction whose angle difference with the current search direction is minimal. Then at step 1490, the points following status is set to can continue status. Finally, at step 1495, the intersection detection sub-process 646 returns the points following status and possibly the new search direction.

Figure 16:
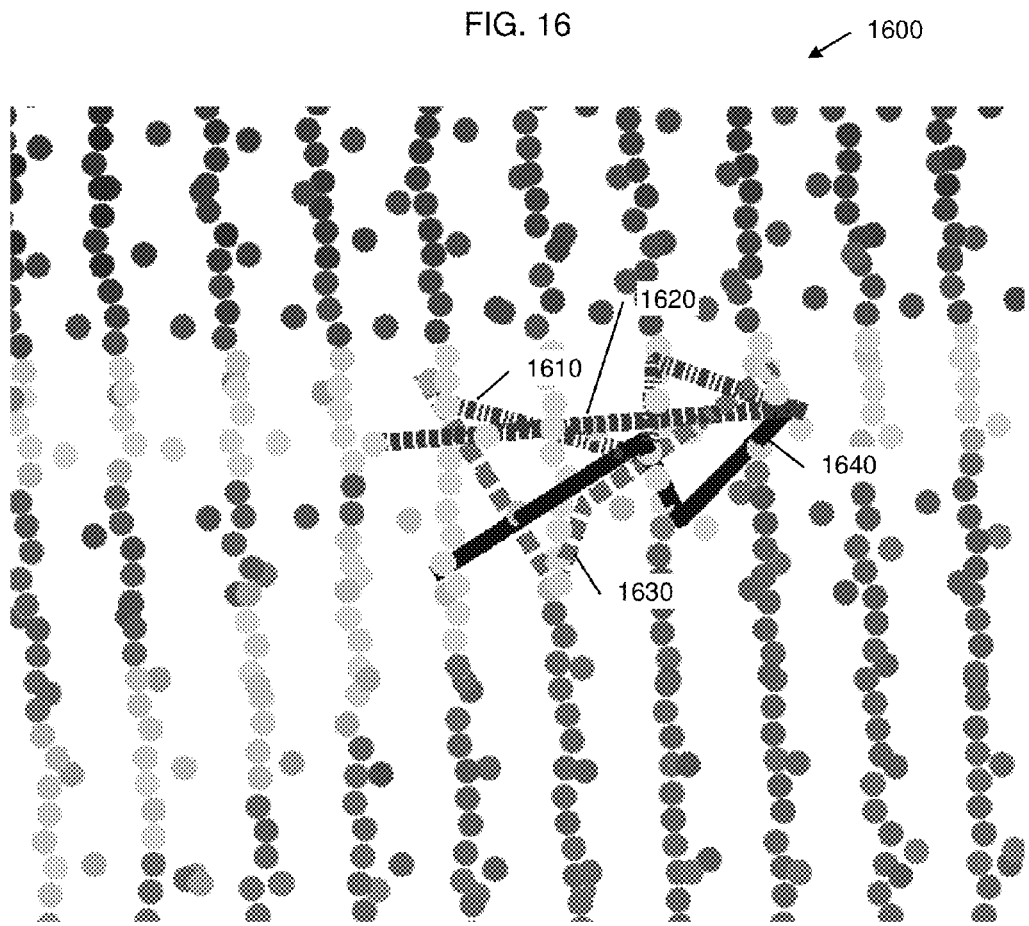
FIG. 16 is a diagram illustrating linear features found by the intersection detection sub-process.

As mentioned above, linear features may be merged during operation of the intersection detection sub-process 646. Often linear features found in different directions may be treated as part of the same linear feature. FIG. 16 is a diagram 1600 illustrating linear features that should be merged. Linear features 1610, 1620, 1630 should be merges to be part of a horizontal linear feature attached to an intersection, while linear feature 1640 should be treated as an angled linear feature attached to the intersection.

Figure 17:
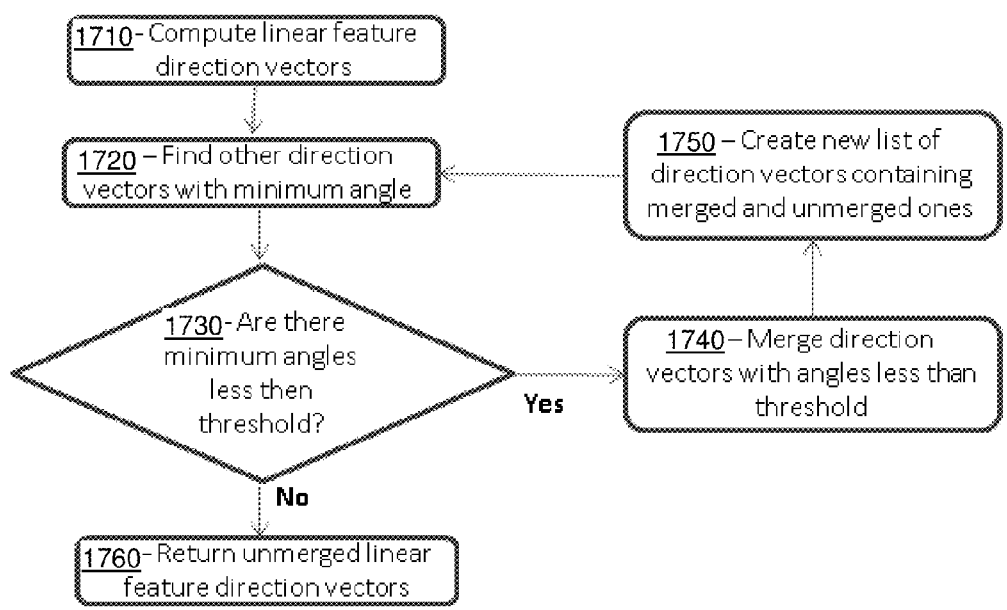
FIG. 17 is an example sequence of steps executed by the linear feature merging sub-process to merge linear features.
Figure 18:
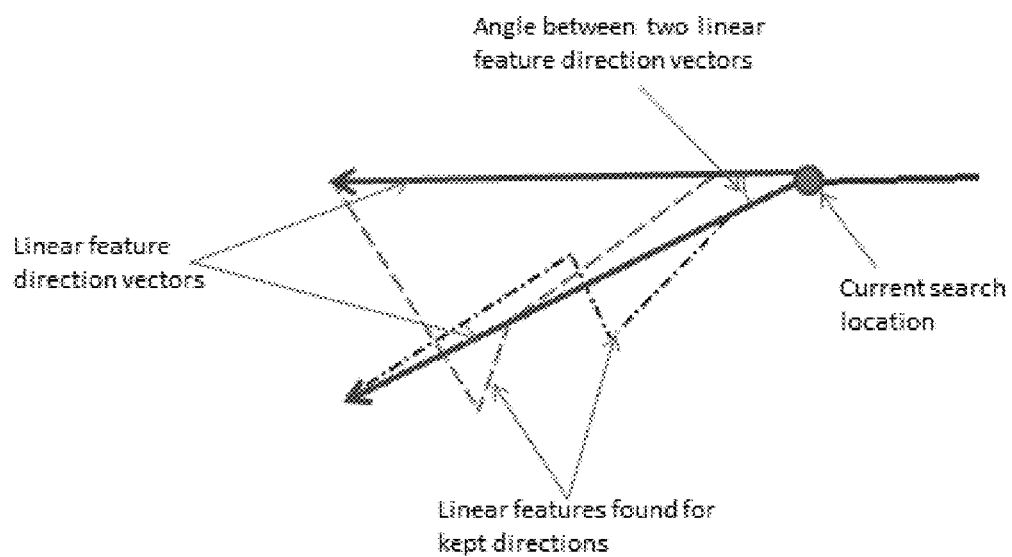
FIG. 18 is a diagram illustrating properties used by the linear feature merging sub-process to merge linear features.

FIG. 17 is an example sequence of steps 1700 executed by the linear feature merging sub-process 647 to merge linear features. The sequence of steps 1700 may represent steps performed as part of the step 1460 in FIG. 14. The steps 1700 are explained in reference to FIG. 18. FIG. 18 is a diagram 1800 illustrating properties used by the linear feature merging sub-process 647 to merge linear features. At step 1710, linear feature direction vectors (FIG. 18) are computed for each kept direction based on the current search location (FIG. 18), and the endpoints of the linear features found for the kept direction, if any. At step 1720, for each direction vector, the linear feature merging sub-process 647 searches the other direction vector for which the angle between the two direction vectors is minimal. At step 1730, the linear feature merging sub-process 647 determines whether there is at least one minimal angle between two direction vectors that is less than a threshold. In one embodiment, the threshold may be set to 11.25°, however a variety of other values may be used. If there is at least one minimal angle between two direction vectors that is less than a threshold, execution proceeds to step 1740, where all the pairs of direction vectors with angles less than the threshold are merged together. The merging may be performed by computing the sum of the direction vectors and normalizing the resulting vector. Then, at step 1750, the linear feature merging sub-process 647 creates a new direction vectors list containing any direction vectors resulting from the merging operation, and any direction vectors that weren't merged. Execution then loops back to step 1720. Execution continues to loop through steps 1720-1750 until at step 1730 the result is negative. At which point, there are no more direction vectors to merge and execution proceeds to step 1760, where the linear feature merging sub-process 647 returns the linear feature direction vectors that cannot be merged further.

Figure 19:
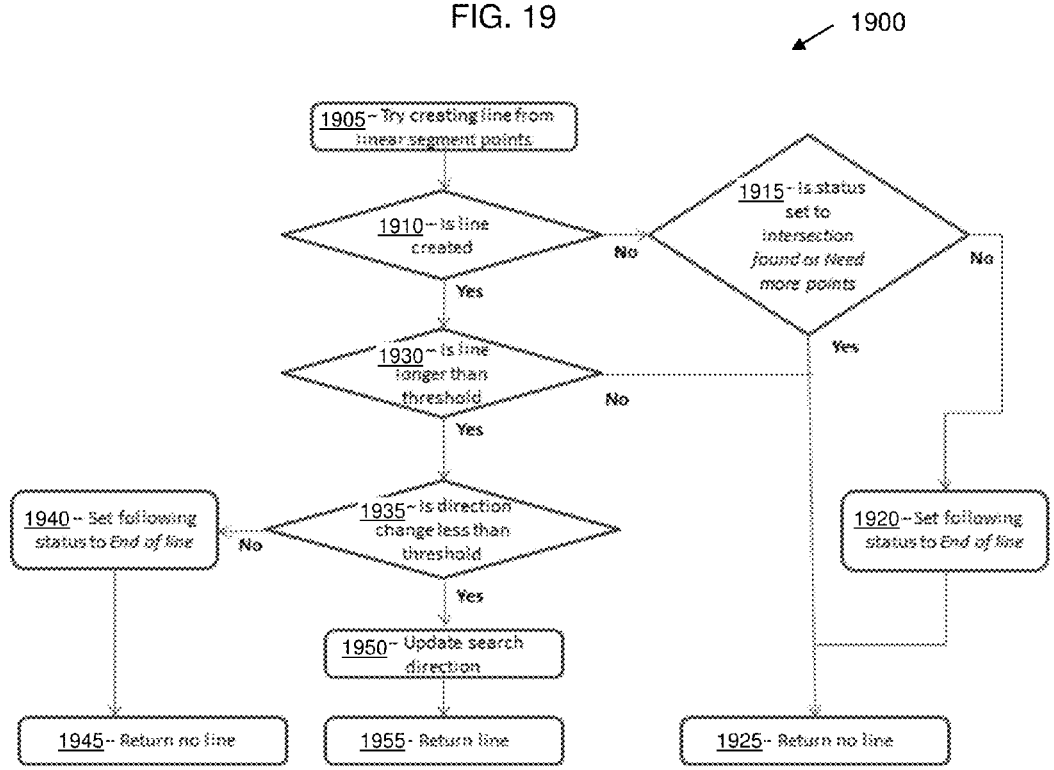
FIG. 19 is an example sequence of steps executed by a line segment creation sub-process to create a line segment modeling a linear segment of a linear feature.

FIG. 19 is an example sequence of steps 1900 executed by a line segment creation sub-process 648 to create a line segment modeling a linear segment of a linear feature. The sequence of steps 1900 may represent steps performed as part of the step 940 in FIG. 9. At step 1905, the line segment creation sub-process 648 tries to create a line segment from the linear segment points found by the points following sub-process 645. The line segment creation sub-process 648 may use a RANSAC algorithm to search for a line segment that adequately represents the points found. One parameter used by the RANSAC algorithm is a maximum distance between a point and a potential line segment allowed for the point to be considered as part of the line segment. In one embodiment, this maximum distance may be set to the search radius multiplied by a scaling factor. The scaling factor may be set to 0.5 or some other value. At step 1910, a check is performed of whether the RANSAC algorithm has been able to create a line. If a line has not been created, execution proceeds to step 1915, where the line segment creation sub-process 648 checks if the current points following status is set to intersection found status or need more points status. If the current points following status has not been set to intersection found status or need more points status, execution proceeds to step 1920, where the points following status is set to end of line status. If the current points following status has been set to intersection found status or need more points status, execution proceeds to step 1925, where the line segment creation sub-process 648 returns that a line segment cannot be found from the points provided.

Returning to step 1910, if the RANSAC algorithm has been able to create a line, execution proceeds to step 1930, where a check is performed whether line segment is longer than a threshold. In one embodiment, the threshold is set to the maximum line width specified by the user in the user interface 700 of FIG. 7. If the length of line is shorter than the threshold, execution proceeds to step 1925, where it is returned that a line segment cannot be found from the points provided. If the length of the line is longer than the threshold, execution proceeds to step 1935, where the line segment creation sub-process 648 checks if a direction change is less than a threshold. This threshold may be is the same one discussed above in relation to step 1360 of FIG. 13, or some other value. If the direction change is not less than the threshold, execution proceeds to step 1940, where the line segment creation sub-process 648 sets the points following status to end of line status. Then, at step 1945, it returns that no line segment can be found. If the direction change is less than the threshold, execution proceeds to step 1950, where the line segment creation sub-process 648 updates the search direction. The new search direction is simply the direction of the line found. Then, at step 1955, it returns the line segment found.

As mentioned above, the gap jumping sub-process 649 of the linear feature extraction process 642 may determine whether the end of the linear feature is a true end, or is simply an occlusion of the linear feature or a non-continuous portion of a linear feature (e.g., a space between dashed lane marking on a roadway). If it is determined there is a jumpable gap, the gap may be jumped and further linear segments of the linear feature followed after the gap.

Figure 20:
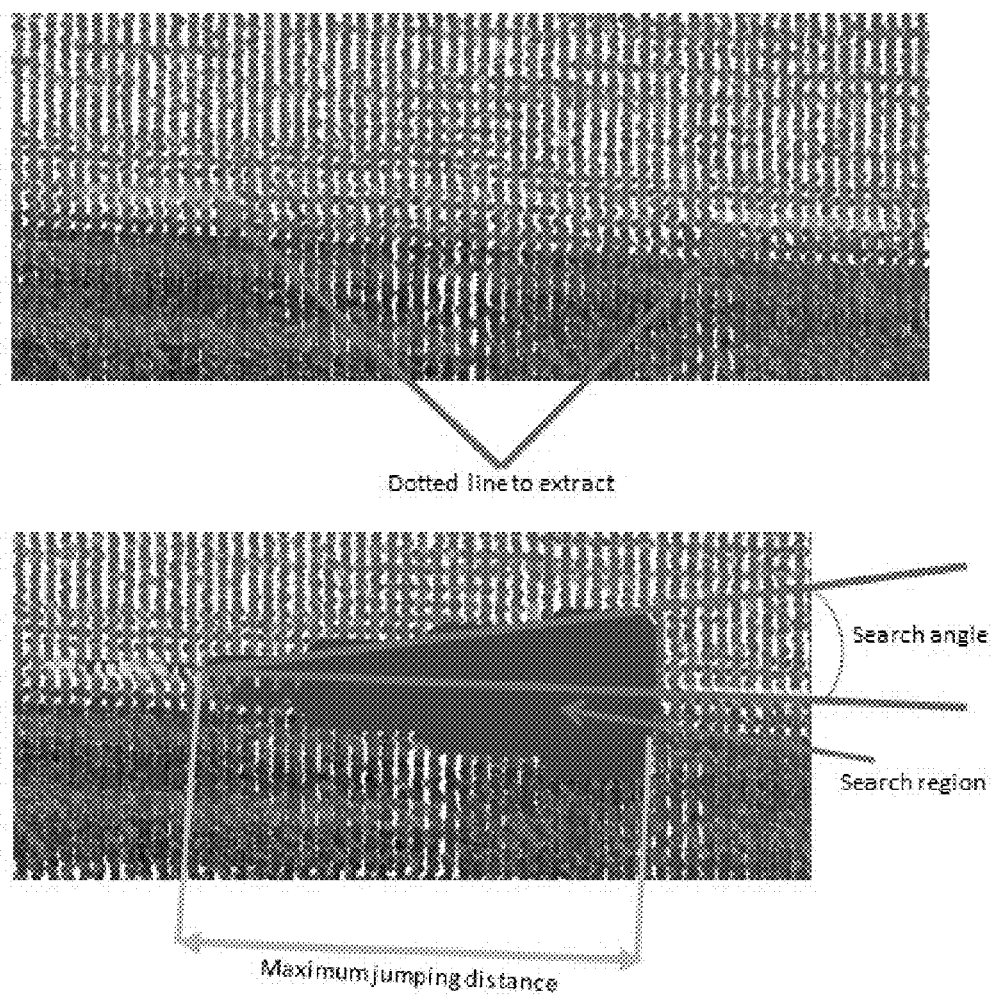
FIG. 20 is a diagram showing a top view of an example cone-like search region that may be used by the gap jumping sub-process when jumping gaps of a non-continuous linear feature.
Figure 21:
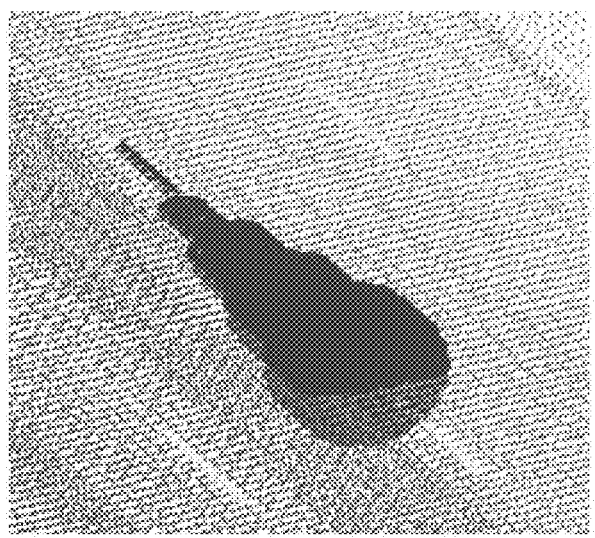
FIG. 21 is an isometric view of the example cone-like search region from FIG. 20.

In general, the gap jumping sub-process 649 may operate to search for a location around which a sufficient number of points are present. The searching may occur within a cone-like search region. FIG. 20 is a diagram 2000 showing a top view of an example cone-like search region that may be used by the gap jumping sub-process 649 when jumping gaps of a non-continuous linear feature (e.g., a dashed marking). The cone-like search region may be defined by two parameters: a search angle and a maximum jumping distance. FIG. 21 is an isometric view 2100 of the example cone-like search region from FIG. 20.

While the search region is cone-like, in one embodiment, it is not a true cone. Instead, it is composed of a shape formed from a plurality of search spheres whose centers are distributed along a series of concentric circles arranged in 3-D space. The union of all the search spheres centered along the concentric circles appears cone-like.

Figure 22:
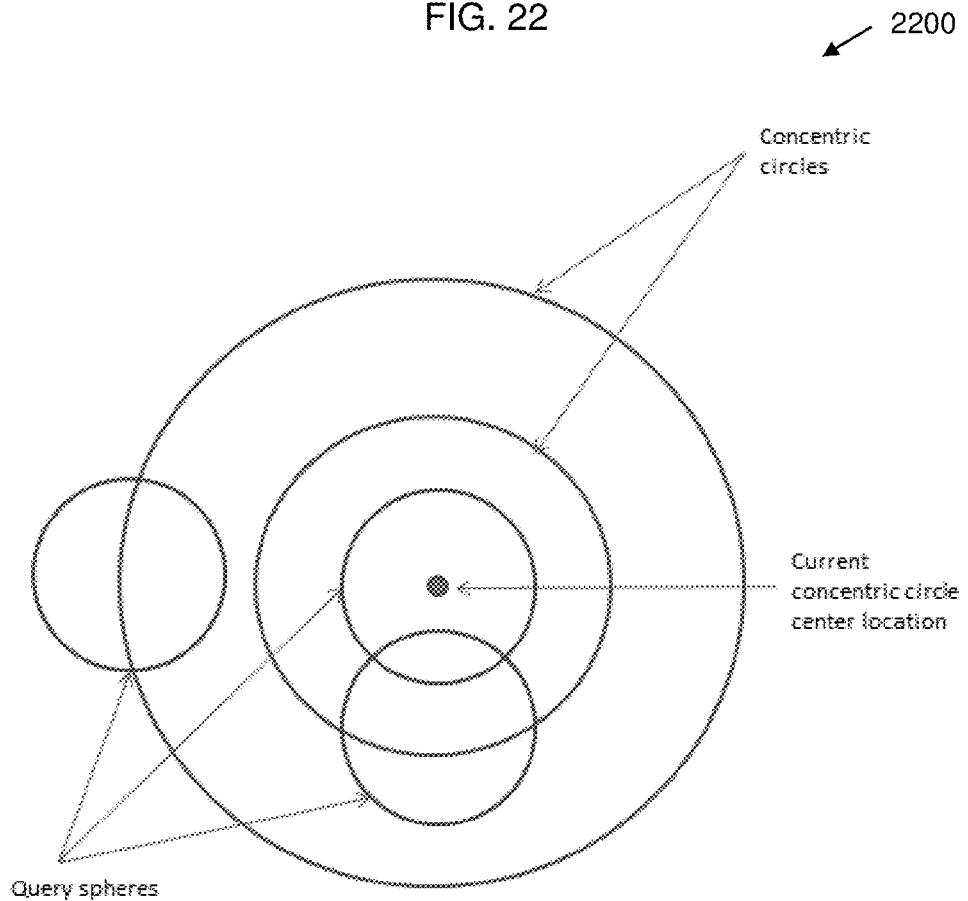
FIG. 22 is a front view of example search spheres distributed along a series of concentric circles forming a cone-like search region.

FIG. 22 is a front view 2200 of example search spheres distributed along a series of concentric circles forming a cone-like search region. The concentric circles are positioned relative to a concentric circle center location. Only three example search spheres are shown in FIG. 22, for clarity. However, it should be understood that in a real implementation a large number of search spheres would be homogenously distributed along is each concentric circle, such that all the area along each concentric circle is covered. The number of concentric circles may depend on the search angle and the current position of the concentric circle center location.

Figure 23:
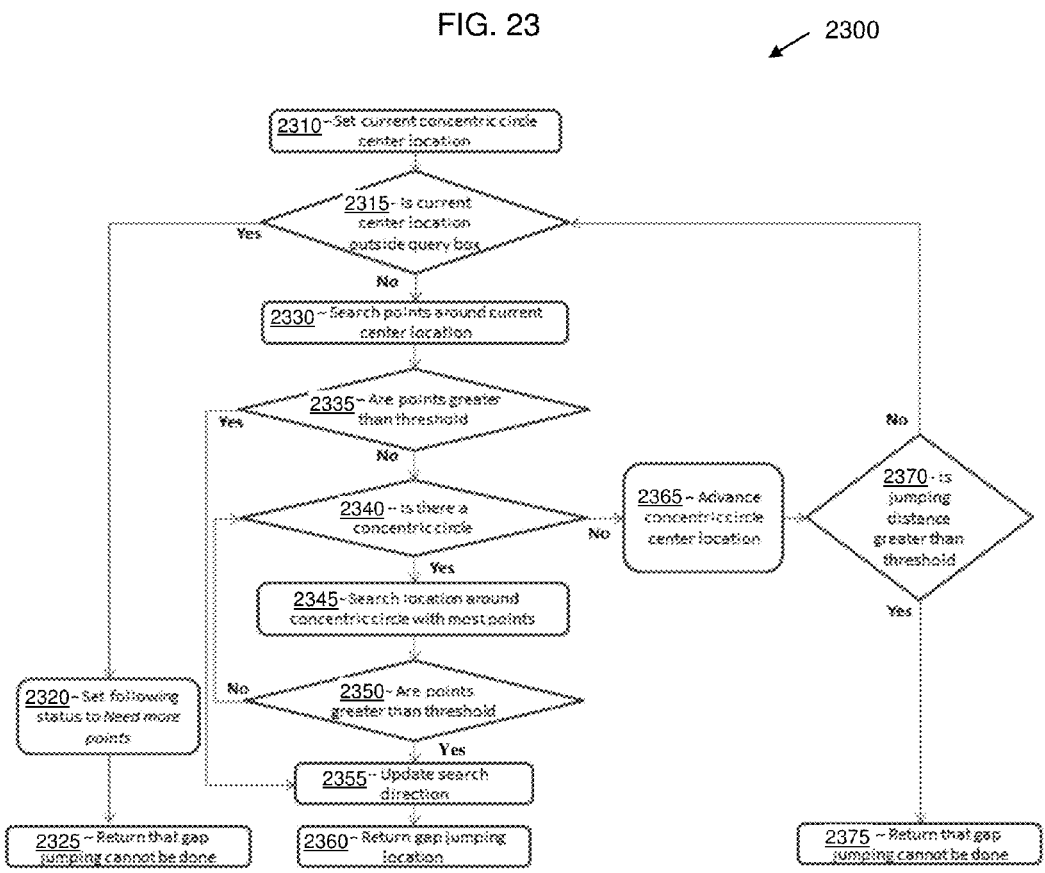
FIG. 23 is an example sequence of steps executed by gap jumping sub-process to extract points around a search location.

FIG. 23 is an example sequence of steps 2300 executed by gap jumping sub-process 649 to extract points around a search location. The sequence of steps 2300 may represent steps performed as part of the step 970 in FIG. 9. At step 2310, the gap jumping sub-process 649 sets the current concentric circle center location to the current search location. At step 2315, the gap jumping sub-process 649 checks if the current concentric circle center location is outside the current query box. If the current concentric circle center location is outside the current query box, execution proceeds to step 2320, where the points following status is set to need more points status. Then, at step 2325, the gap jumping sub-process 649 returns that there is not a jumpable gap, and therefore gap jumping cannot be performed. If the current concentric circle center location is not outside the current query box, execution proceeds to step 2330, where the gap jumping sub-process 649 searches points around the current concentric circle center location. At step 2335, the gap jumping sub-process 649 tests if the number of points found around the current concentric circle center location is greater than a threshold. In one embodiment, the threshold is set to 0, however, it can have other values. If the number of points found around the current concentric circle center location is greater than the threshold, the gap jumping sub-process 649 proceeds to step 2355, where the current search direction is updated. Then at step 2360 the current concentric circle center is returned as the gap jumping location. If at step 2335 the number of points found around the current concentric circle center location is not greater than the threshold, execution proceeds to step 2340, where the gap jumping sub-process 649 checks if there is a concentric circle to search along. If there is a concentric circle to search along, then execution proceeds to step 2345, where a search is performed around the concentric circle with the most points. As part of step 2345, a check of whether the search location is outside the query box may be performed, and if this is the case, execution may jump immediately to steps 2320 and 2325. Provided this is not the case, execution proceeds to step 2350, where the gap jumping sub-process 649 checks if the number of points at the location along the current is concentric circle with the most points is greater than a threshold. In one embodiment, the threshold may be equal to the threshold used in step 2335. If the number of points is greater than the threshold, execution proceeds to step 2355, where the current search direction is updated. Then, at step 2360 a location around the concentric circle with the most points is returned as the gap jumping location. A new search direction may be defined as a vector extending from the current search location to the gap jumping location. The search direction may be updated when the angle between the new search direction and the current search direction is less than a threshold. In one embodiment, this threshold is 45°, however other values may be used.

If, at step 2350, the number of points is not greater than the threshold, execution loops back to step 2340 where the gap jumping sub-process 649 checks if there is another concentric circle to check. At step 2340, if there is no other concentric circle for the current concentric circle center location, execution proceeds to step 2365 where the concentric circle center location is advanced along the current search direction to a distance equaling the search radius. Then, at step 2370, the gap jumping sub-process 649 checks if the distance between the current search location and the current concentric circle center location is greater than a threshold. If the gap jumping distance is greater than the threshold, execution proceeds to step 2375, where it is returned that there is no jumpable gap and therefore gap jumping cannot be performed. In one embodiment, the threshold can be set to the specified gap jumping maximum length specified by the user in the user interface 700 of FIG. 7. Otherwise, execution proceeds back to step 2315, where a new concentric circle center location is processed.

In summary, the above description provides a technique for semi-automatically extracting a polyline from a linear feature in a point cloud. While various specific embodiments are described, it should be apparent that the technique may be implemented more generally, to cover a variety of other embodiments. A wide variety of modifications and/or additions to what is described above are possible. In general, it should be understood that the above descriptions are meant to be taken only by way of example.

Further, it should be understood that the above described technique may be implemented in software, in hardware, or a combination thereof. A software implementation may include executable instructions that implement applications stored in a non-transitory computer-readable medium, such as a volatile or persistent memory device, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as one or more hardware components.

What is claimed is:

1. A method for semi-automatically extracting a polyline from a linear feature in a point cloud, comprising:
   receiving, from a user, a selected point in the point cloud about the linear feature in the point cloud;
   receiving, from the user, a starting search direction;
   returning a plurality of line segments based on the linear feature by a process executing on an electronic device, by:
      successively following one or more linear segments of the linear feature, beginning with a current search direction set to the starting search direction and a current search location set about the selected point, and modeling the linear segments with line segments, wherein
      when an end of a linear segment is reached, determining whether there is an intersection based on detection of greater than a threshold number of points of the linear feature in multiple directions,
      in response to there being an intersection, prompting the user to provide an updated search direction that is used as the current search direction,
      in response to there not being an intersection, continuing to successively follow one or more linear segments of the linear feature after the intersection, and modeling the one or more linear segments after the intersection with line segments,
      when an end of a linear segment is reached, determining whether there is a jumpable gap,
      in response to determining there is a jumpable gap, continuing to successively follow one or more linear segments of the linear feature after the jumpable gap, and modeling the one or more linear segments after the jumpable gap with line segments, and
      in response to there not being a jumpable gap, returning the line segments; and
   creating a polyline from the returned line segments.

2. The method of claim 1, wherein the following one or more linear segments of the linear feature comprises:
   fetching only a limited number of points around the current search location in the point cloud for use in following the one or more linear segments of the linear feature.

3. The method of claim 2, wherein the fetching points further comprises:
   creating a query box;
   extracting points of the point cloud that fall within the query box;
   comparing a number of points extracted to one or more thresholds;
   increasing or decreasing a dimension of the query box based on the comparing; and
   returning extracted points.

4. The method of claim 1, wherein the following one or more linear segments of the linear feature further comprises:
   searching for points around the current search location;
   advancing the current search location; and
   when a determination is made that point following should stop, returning followed points.

5. The method of claim 4, wherein the following one or more linear segments of the linear feature further comprises:
   determining the linear feature has turned; and
   updating the current search direction and the current search location based on the turn.

6. The method of claim 1, wherein in response to there being an intersection, further determining there are groups of points having directions that differ by an angle less than a threshold and merging the groups of points having directions that differ by the angle less than the threshold.

7. The method of claim 1, wherein modeling the linear segments with line segments further comprises:
   creating a line segment by applying a RAMdom SAmple Consensus (RANSAC) algorithm to points of the linear segment.

8. The method of claim 1, wherein determining there is a jumpable gap further comprises:
   searching for a location around which at least a threshold number of points are present within a cone-like search region extending from the current search location;
   updating the current search direction based on the location within the cone-like search region; and
   continuing to follow one or more linear segments of the linear feature from the location within the cone-like search region.

9. The method of claim 1, wherein the point cloud represents one or more objects in the physical environment.

10. An apparatus to semi-automatically extract a polyline from a linear feature in a point cloud, comprising:
    a display screen configured to display a user interface;
    a processor; and
    a memory coupled to the processor and configured to store instructions for a line extraction software process that when executed by the processor is operable to:
       successively follow one or more linear segments of the linear feature in the point cloud, beginning with a current search location set about a selected point and a current search direction set to a starting search direction that are provided by a user in the user interface and model the linear segments with line segments, wherein
          when an end of a linear segment is reached, determine whether there is an intersection based on detection of greater than a threshold number of points of the linear feature in multiple directions,
          in response to there being an intersection, prompt the user to provide an updated search direction that is used as the current search direction,
          in response to there not being an intersection, continue to successively follow one or more linear segments of the linear feature after the intersection, and model the one or more linear segments after the intersection with line segments,
          when an end of a linear segment is reached, determine whether there is a jumpable gap,
          in response to determining there is a jumpable gap, continue to successively follow one or more linear segments of the linear feature after the jumpable gap, and model the linear segments after the jumpable gap with line segments,
          in response to there not being a jumpable gap, return the line segments; and
       create a polyline from the returned line segments.

11. The apparatus of claim 10, wherein the line extraction software process when executed by the processor is further operable to:
    fetch only a limited number of points around the current location in the point cloud for use in following the one or more linear segments of the linear feature.

12. The apparatus of claim 11, wherein the line extraction software process when executed by the processor is further operable to:
    create a query box;
    extract points of the point cloud that fall within the query box;
    compare a number of points extracted to one or more thresholds;
    increase or decrease a dimension of the query box based on the comparing; and
    return extracted points.

13. The apparatus of claim 10, wherein the line extraction software process when executed by the processor is further operable to:
    search for points around the current search location;
    advance the current search location; and
    when a determination is made that point following should stop, return followed points.

14. The apparatus of claim 13, wherein the line extraction software process when executed by the processor is further operable to:
    determine the linear feature has turned; and
    update the current search direction and the current search location based on the turn.

15. The apparatus of claim 10, wherein the line extraction software process when executed by the processor is further operable to:
    in response to there being an intersection, further determine there are groups of points having directions that differ by an angle less than a threshold and merge the groups of points having directions that differ by the angle less than the threshold.

16. The apparatus of claim 10, wherein the line extraction software process when executed by the processor is further operable to:
    create a line segment by applying a RANdom SAmple Consensus (RANSAC) algorithm to points of a linear segment.

17. The apparatus of claim 10, wherein the line extraction software process when executed by the processor is further operable to:
    search for a location around which at least a threshold number of points are present within a cone-like search region extending from the current search location;
    update the current search direction based on the location within the cone-like search region; and
    continue to follow one or more linear segments of the linear feature from the location within the cone-like search region.

18. A non-transitory computer-readable medium that includes instructions executable on a processor, the instructions, when executed, operable to:
    receive a user-provided selected point in a point cloud about a linear feature in a point cloud;
    receive a user-provided starting search direction;
    follow the linear feature beginning with a current search direction set to be the starting search direction and a current search location set to be about the selected point, by successively:
       searching for points associated with the linear feature in a plurality of search spheres disposed about the current search location, determining whether there is greater than a threshold number of points of the linear feature in multiple search spheres of the plurality of search spheres, when there is not greater than the threshold number of points of the linear feature in multiple search spheres, extending the linear feature by detecting one or more points that define a linear segment, modeling the linear segment with a line segment, advancing the current search location, and updating the current search direction, and when there is greater than the threshold number of points of the linear feature in multiple search spheres, determining an intersection is reached;

in response to there being an intersection, prompt a user to provide an updated search direction, and continue to follow the linear feature with the current search direction set to the updated search direction; and create a polyline from any line segments.

19. The non-transitory computer-readable medium of claim 18, wherein the threshold number of points is based on a percentage of a maximum number of points found in any search sphere.

20. The non-transitory computer-readable medium of claim 18, wherein the instructions to determine an intersection is reached, when executed, are further operable to:

when there is greater than the threshold number of points of the linear feature in multiple search spheres, attempting to follow the linear feature in the multiple search directions for a number of searches;

determine whether the linear feature in two or more of the multiple search directions differs by an angle less than a threshold angle;

when the linear feature in the two or more search directions differs by an angle less than the threshold angle, merging the linear feature in the two or more search directions into a linear feature in one direction; and when there is still a linear feature in multiple search directions after merging, determine the intersection is reached.

21. The non-transitory computer-readable medium of claim 18, wherein the instructions, when executed, are further operable to:

when an end of a linear segment is reached, determine whether there is a jumpable gap;

in response to determining there is a jumpable gap, continuing extending the linear feature by successively detecting one or more points that define a new linear segment, modeling the new linear segment with a line segment, advancing the current search location, and updating the current search direction; and in response to there not being a jumpable gap, returning any line segments for creating the polyline.

* * * * *